(12) United States Patent
Lamping et al.

(10) Patent No.: US 7,451,129 B2
(45) Date of Patent: Nov. 11, 2008

(54) SYSTEM AND METHOD FOR PROVIDING PREFERRED LANGUAGE ORDERING OF SEARCH RESULTS

(75) Inventors: John Lamping, Los Altos, CA (US); Ben Gomes, Mountain View, CA (US); Mizuki McGrath, San Francisco, CA (US); Amit Singhal, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 560 days.

(21) Appl. No.: 10/407,476

(22) Filed: Apr. 3, 2003

(65) Prior Publication Data

US 2004/0194099 A1 Sep. 30, 2004

Related U.S. Application Data

(60) Provisional application No. 60/459,339, filed on Mar. 31, 2003.

(51) Int. Cl.
*G06F 17/30* (2006.01)

(52) U.S. Cl. ............. 707/3; 707/4; 707/5; 707/101

(58) Field of Classification Search .......... 707/1–10; 715/703; 704/1, 3, 8; 709/219; 705/4
See application file for complete search history.

(56) References Cited

U.S. PATENT DOCUMENTS

| | | | |
|---|---|---|---|
| 5,056,021 A | | 10/1991 | Ausborn |
| 5,148,541 A | * | 9/1992 | Lee et al. .................. 707/2 |
| 5,416,903 A | * | 5/1995 | Malcolm .................. 715/703 |
| 5,488,725 A | | 1/1996 | Turtle et al. |
| 5,778,356 A | * | 7/1998 | Heiny ......................... 707/2 |
| 6,167,369 A | | 12/2000 | Schulze |
| 6,173,275 B1 | | 1/2001 | Caid et al. |
| 6,285,999 B1 | | 9/2001 | Page |
| 6,311,180 B1 | * | 10/2001 | Fogarty ....................... 707/4 |
| 6,356,894 B2 | * | 3/2002 | Nosohara .................... 707/3 |
| 6,370,498 B1 | * | 4/2002 | Flores et al. ................ 704/3 |
| 6,377,961 B1 | | 4/2002 | Ryu |
| 6,446,061 B1 | | 9/2002 | Doerre et al. |

(Continued)

FOREIGN PATENT DOCUMENTS

EP 0 944 002 9/1999

(Continued)

OTHER PUBLICATIONS

S. Brin and L. Page, "The Anatomy of a Large-Scale Hypertextual Search Engine," (1998).

(Continued)

*Primary Examiner*—Khanh B Pham
(74) *Attorney, Agent, or Firm*—Harrity & Harrity, LLP

(57) ABSTRACT

A system and method for providing preferred language ordering of search results is described. A search query describing potentially retrievable information provided in a plurality of search result languages is received. A search is executed by evaluating the search query against information characteristics maintained in a searchable data repository. At least one preferred language applicable to search results generated responsive to the executed search is dynamically determined. At least some of the search results are ordered in consideration of the at least one preferred language.

83 Claims, 14 Drawing Sheets

U.S. PATENT DOCUMENTS

| | | | |
|---|---|---|---|
| 6,510,406 B1 | 1/2003 | Marchisio | |
| 6,516,337 B1 | 2/2003 | Meadway et al. | |
| 6,542,888 B2 * | 4/2003 | Marques | 707/5 |
| 6,560,597 B1 | 5/2003 | Dhillon et al. | |
| 6,623,529 B1 * | 9/2003 | Lakritz | 715/536 |
| 6,675,159 B1 | 1/2004 | Lin et al. | |
| 6,701,305 B1 | 3/2004 | Holt et al. | |
| 6,711,585 B1 | 3/2004 | Copperman et al. | |
| 6,952,691 B2 * | 10/2005 | Drissi et al. | 707/3 |
| 7,028,027 B1 * | 4/2006 | Zha et al. | 707/3 |
| 2002/0059228 A1 * | 5/2002 | McCall et al. | 707/6 |
| 2002/0082464 A1 | 6/2002 | Japp et al. | |
| 2003/0046056 A1 * | 3/2003 | Godoy et al. | 704/1 |
| 2003/0191817 A1 * | 10/2003 | Fidler | 709/219 |
| 2004/0088196 A1 * | 5/2004 | Childress et al. | 705/4 |
| 2004/0111254 A1 * | 6/2004 | Gogel et al. | 704/8 |
| 2004/0128282 A1 * | 7/2004 | Kleinberger et al. | 707/3 |
| 2004/0254932 A1 | 12/2004 | Gupta et al. | |
| 2006/0200766 A1 * | 9/2006 | Lakritz | 715/536 |

FOREIGN PATENT DOCUMENTS

| | | |
|---|---|---|
| JP | H09-305518 A | 11/1997 |
| WO | WO 00/41090 | 7/2000 |
| WO | WO 01/25947 | 4/2001 |
| WO | WO 02/07011 | 1/2002 |

OTHER PUBLICATIONS

D. Gourley and E. Totty, "HTTP, the Definitive Guide," 2002, Ch. 3, pp. 43-73, O'Reilly and Assocs., Sebastopol, CA.

Christina Yip Chung et al, "Thematic Mapping—From Unstructured Documents To Taxonomies," CIKM'02, Nov. 4-9, 2002, pp. 608-610, ACM, McLean, Virginia, USA.

Hiroyuki Kawano, "Overview of Mondou Web Search Engine Using Text Mining And Information Visualizing Technologies," IEEE, 2001, pp. 234-241.

James Osborn et al "JUSTICE: A Judicial Search Tool Using Intelligent Concept Extraction," ICAIL-99, 1999, pp. 173-181, ACM.

Non-final Office Action mailed Jan. 31, 2006 for co-pending U.S. Appl. No. 10/607,927, 41 pages.

Final Office Action mailed Sep. 28, 2006 for co-pending U.S. Appl. No. 10/607,927, 51 pages.

Non-final Office Action mailed Jun. 12, 2007 for co-pending U.S. Appl. No. 10/607,927, 19 pages.

Final OA mailed Jan. 23, 2008 for co-pending U.S. Appl. No. 10/607,927, 18 pages.

Christina Yip Chung et al, "Thematic Mapping - From Unstructured Documents To Taxonomies," CIKM'02, Nov. 4-9, 2002, pp. 608-610, ACM, McLean, Virginia, USA.

Hiroyuki Kawano, "Overview of Mondou Web Search Engine Ysing Text Mining And Information Visualizing Technologies," IEEE, 2001, pp. 234-241.

James Osborn et al "Justice: A Judicial Search Tool Using Intelligent Concept Extraction," ICAIL-99, 1999, pp. 173-181, ACM.

Chen An et al "Fuzzy Concept Graph And Application In web Document Clustering," 2001, pp. 101-106, IEEE.

* cited by examiner

```
        ( Order by
          Shifting Factor )
               │
               ▼
151 — ┌─────────────────────────┐
      │ Set n to number         │
      │ of search results       │
      │ Set UL to Least (n, 2n) │
      │ Set LPUL to Least (n, 2n)│
      └─────────────────────────┘
               │
               ▼
152 — ┌─────────────────────────┐
      │      Set j to UL        │
      └─────────────────────────┘
               │
               ▼
153 —   ╱ While j > 0, Do ╲
               │
               ▼
            ╱      ╲
154 —      ╱ Result [j]╲         No
          ╱ not in Pref_Lang and╲────────────┐
          ╲ Result [j] not in   ╱             │
           ╲Less_Pref_Lang?    ╱              │
            ╲      ╱                          │
              Yes                             │
               │                              │
               ▼                              │
155 — ┌─────────────────────────┐             │
      │     Set target_pos      │             │
      │     to Least (2j, UL)   │             │
      └─────────────────────────┘             │
               │                              │
               ▼                              │
156 — ┌─────────────────────────┐             │
      │      Set temp           │             │
      │      to Result [j]      │             │
      └─────────────────────────┘             │
               │                              │
               ▼                              │
157 — ┌─────────────────────────┐             │
      │ Shift (Results [j + 1], │             │
      │ Results [target_pos]    │             │
      │ up by one)              │             │
      └─────────────────────────┘             │
               │                              │
               ▼                              ▼
              (B)                            (C)
```

SYSTEM AND METHOD FOR PROVIDING PREFERRED LANGUAGE ORDERING OF SEARCH RESULTS

CROSS-REFERENCE TO RELATED APPLICATION

This non-provisional patent application claims priority under 35 USC § 119(e) to U.S. provisional patent application Ser. No. 60/459,339, entitled "System And Method For Providing Preferred Language Ordering Of Search Results," filed Mar. 31, 2003, the disclosure of which is incorporated by reference.

FIELD OF THE INVENTION

The present invention relates in general to information location and, in particular, to a system and method for providing preferred language ordering of search results.

BACKGROUND OF THE INVENTION

Although the Internet traces back to the late 1960s, the widespread availability and acceptance of personal computing and internetworking have resulted in the explosive growth and unprecedented advances in information sharing technologies. In particular, the Worldwide Web ("Web") has revolutionized accessibility to untold volumes of information in stored electronic form to a worldwide audience, including written, spoken (audio) and visual (imagery and video) information, both in archived and real-time formats. In short, the Web has provided desktop access to every connected user to a virtually unlimited library of information in almost every language worldwide.

Information exchange on the Web operates under a client-server model. Individual clients execute Web content retrieval and presentation applications, typically in the form of Web browsers. The Web browsers send request messages for Web content to centralized Web servers, which function as data storage and retrieval repositories. The Web servers parse the request messages and return the requested Web content in response messages.

Search engines have evolved in tempo with the increased usage of the Web to enable users to find and retrieve relevant Web content in an efficient and timely manner. As the amount and types of Web content has increased, the sophistication and accuracy of search engines has likewise improved. Generally, search engines strive to provide the highest quality results in response to a search query. However, determining quality is difficult, as the relevance of retrieved Web content is inherently subjective and dependent upon the interests, knowledge and attitudes of the user.

Existing methods used by search engines are based on matching search query terms to terms indexed from Web pages. More advanced methods determine the importance of retrieved Web content using, for example, a hyperlink structure-based analysis, such as described in S. Brin and L. Page, "The Anatomy of a Large-Scale Hypertextual Search Engine," (1998) and in U.S. Pat. No. 6,285,999, issued Sep. 4, 2001 to Page, the disclosures of which are incorporated by reference.

A typical search query scenario begins with either a natural language question or individual keywords submitted to a search engine. The search engine executes a search against a data repository describing information characteristics of potentially retrievable Web content and identifies the candidate search results. Searches can often return thousands or even millions of results, so most search engines typically rank or score only a subset of the most promising results. Targeted search results can also be introduced, such as advertising or topical information content. The top search results are then presented to the user, usually in the form of Web content titles, hyperlinks, and other descriptive information, such as snippets of text taken from the search results.

Search engines are generally available to users located worldwide. Thus, part of providing high-quality search results is being able to provide those search results in languages acceptable to the requesting user. Acceptable languages include languages specified by the user, as well as other acceptable languages. For instance, a French-preferring user might also accept search results in English. Acceptable languages can also include related languages and dialects. For example, Portuguese search results might be acceptable to a user who generally prefers Spanish. Finally, acceptable languages can include dead languages, such as classical Greek or Olde English, or psuedo-languages, such as Klingon. Dead and psuedo-languages are typically not supported by search engines, but may nevertheless reflect the academic, historic, or personal interests of the requesting user.

Currently, the Hypertext Transfer Protocol (HTTP) is used by most Web browser, Web server, and related Web applications, to transact Web information exchange. HTTP is a session-less protocol and no state identifying user preferences, including language, is typically maintained. The only information available to indicate the languages acceptable to a user are either preferences maintained independently of each HTTP transaction or within the search query itself. First, user-provided preferences are specified either at the Web client or Web server. Client-side preferences, such as languages accepted by a Web browser, are communicated through request message headers. Server-side preferences are specified via search engine options and are maintained independent of each HTTP transaction using cookies, which must be retrieved from the Web client prior to executing a search, or via a log-in procedure.

Although effective at specifying accepted languages, users seldom explicitly set language preferences in practice. As well, language preferences are often too restrictive, presenting an all-or-nothing paradigm. The language preferences function as a search result filter, providing only those search results in the preferred language and disallowing those search results in related or alternate languages.

Similarly, default settings for specifying accepted languages, either client- or server-side, can further complicate providing suitable search results. Often, default settings can be incorrect. For instance, English could be specified as a default language preference by virtue of a Web browser option, but may be unsuitable for presenting search results to a non-English proficient user.

Second, query-based preferences are derived from the terms in a given search query. Search query terms, however, are not reliable for determining language preferences for several reasons. First, proper nouns, such as the name of a person, place or thing, are often language-independent and are a poor indicator of the language desired for search result presentation. For instance, a search engine will be unable to determine accepted languages for a search query consisting of the proper name "Elvis." Second, search queries, particularly when specified in key words, often consist of only a few individual words, which generally fail to provide sufficient context from which to determine a language preference. Like proper names, individual words can be language-independent or language-misleading. For instance, a search engine could be misled by a search query consisting of the words "Waldorf Astoria."

Accordingly, there is a need to provide an approach to dynamically determining language preferences for the presentation of search results to a user. Preferably, such an approach would accommodate both preferred and lesser preferred languages, which are acceptable to the user, and include both related and alternate languages within the language preferences.

There is a further need for an approach to presenting search results in an ordered fashion in accordance with user preferred languages. Preferably, such an approach would order or score search results to favor those search results in preferred languages while accommodating those search results in other languages.

SUMMARY OF THE INVENTION

The present invention provides a system and method for dynamically determining preferred languages and ordering search results in response to a search query. User preferred and less preferred languages are determined based on an evaluation of search query, user interface, and search result characteristics. Search query characteristics are determined from metadata describing the search query. User interface characteristics are determined also using the search query metadata, as well as client-side and server-side preferences and the Internet protocol (IP) address of the client. Search result characteristics are determined based on an evaluation of each search result. Search results retrieved responsive to the search query are ordered based on the method utilized by the search engine to organize the search results in consideration of the preferred and, if selected, less preferred languages. The search results are ordered by either a predetermined shifting factor or by adjusting a numerical score assigned to each search result by a weighting factor and resorting the search results.

An embodiment provides a system and method for ordering search results. At least one preferred language applicable to search results generated responsive to a search executed on potentially retrievable information and provided in a plurality of search result languages is dynamically determined. At least some of the search results are ordered in consideration of the at least one preferred language.

A further embodiment provides a system and method for providing preferred language ordering of search results. A search query describing potentially retrievable information provided in a plurality of search result languages is received. A search is executed by evaluating the search query against information characteristics maintained in a searchable data repository. At least one preferred language applicable to search results generated responsive to the executed search is dynamically determined. At least some of the search results are ordered in consideration of the at least one preferred language.

A further embodiment provides a system and method for dynamically determining language preferences and ordering of search results. A search query request message is received and at least one of terms and attributes are parsed from the search query request message to identify potentially retrievable Web content provided in a plurality of search result languages. A search is executed by evaluating the at least one of terms and attributes against information characteristics maintained in a searchable data repository and search results are generated responsive to the executed search. At least one preferred language is determined. Characteristics of at least one of the search query request message, a user interface used for sending the search query request message, and the search results are evaluated. The at least one preferred language is selected based on the evaluated characteristics. At least some of the search results are ordered in consideration of the at least one preferred language. The search results are presented as search result response messages.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

System Overview

Figure 1:
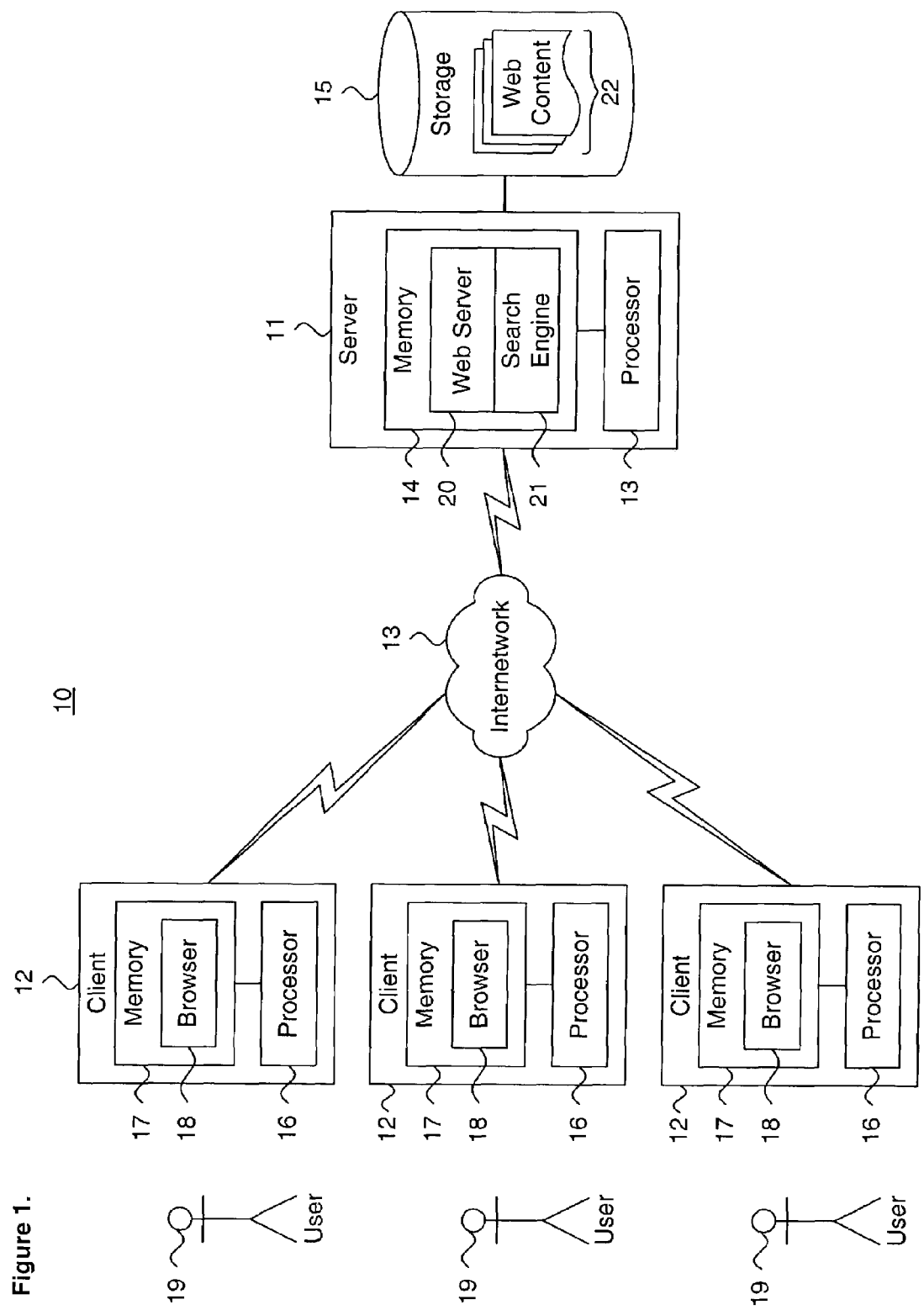
FIG. 1 is a block diagram showing a system for providing preferred language ordering of search results, in accordance with the present invention.

FIG. 1 is a block diagram showing a system 10 for providing preferred language ordering of search results, in accordance with the present invention. A plurality of individual clients 12 are communicatively interfaced to a server 11 via an internetwork 13, such as the Internet, or other form of communications network, as would be recognized by one skilled in the art. The individual clients 12 are operated by users 19 who transact requests for Web content and other operations through their respective client 12.

In general, each client 12 can be any form of computing platform connectable to a network, such as the internetwork 13, and capable of interacting with application programs. Exemplary examples of individual clients include, without limitation, personal computers, digital assistants, "smart" cellular telephones and pagers, lightweight clients, workstations, "dumb" terminals interfaced to an application server, and various arrangements and configurations thereof, as would be recognized by one skilled in the art. The internetwork 13 includes various topologies, configurations, and arrangements of network interconnectivity components arranged to interoperatively couple with enterprise, wide area and local area networks and include, without limitation, conventionally wired, wireless, satellite, optical, and equivalent network technologies, as would be recognized by one skilled in the art.

For Web content exchange and, in particular, to transact searches, each client 12 executes a Web browser 18 ("browser") through which search queries are sent to a Web server 20 executing on the server 11. Each search query describes or identifies information, generally in the form of Web content, which is potentially retrievable via the Web server 20. The search query provides characteristics, typically expressed as terms, such as keywords and the like, and attributes, such as language, character encoding and so forth, which enables a search engine 21, also executing on the server 11, to identify and send back search results. The terms and attributes are a form of metadata, which constitute data describing data. Other styles, forms or definitions of search queries, search query characteristics, and metadata are feasible, as would be recognized by one skilled in the art.

The search results are sent back to the browser 18 for presentation, usually in the form of Web content titles, hyperlinks, and other descriptive information, such as snippets of text taken from the search results. The server 11 maintains an attached storage device 15 in which Web content 22 is maintained. The Web content 22 could also be maintained remotely on other Web servers (not shown) interconnected either directly or indirectly via the internetwork 13 and which are preferably accessible by each client 12.

The search engine 21 preferably identifies the Web content 22 best matching the search query terms to provide high quality search results, such as described in S. Brin and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching Web content 22, the search engine 21 operates on information characteristics describing potentially retrievable Web content, as further described below with reference to FIG. 2. Note the functionality provided by the server 20, including the Web server 20 and search engine 21, could be provided by a loosely- or tightly-coupled distributed or parallelized computing configuration, in addition to a uniprocessing environment.

The individual computer systems, including server 11 and clients 12, include general purpose, programmed digital computing devices consisting of a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Search Engine Components

Figure 2:
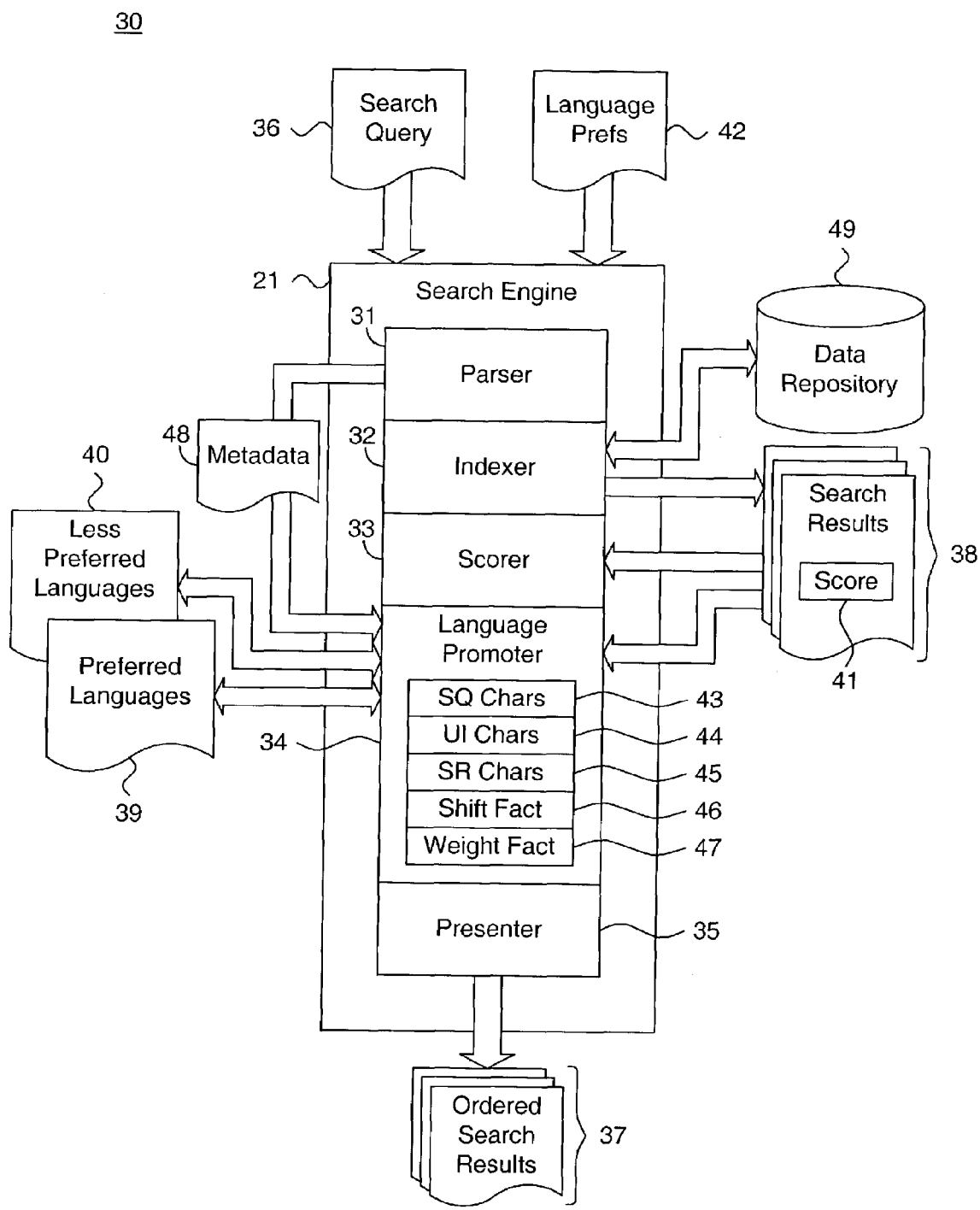
FIG. 2 is a functional block diagram showing the search engine of FIG. 1.

FIG. 2 is a functional block diagram showing the search engine 21 of FIG. 1. Each component is a computer program, procedure or process written as source code in a conventional programming language, such as the C++ programming language, and is presented for execution by one or more CPUs as object or byte code in a uniprocessing, distributed or parallelized configuration, as is known in the art. The various implementations of the source code and object and byte codes can be held on a computer-readable storage medium or embodied on a transmission medium in a carrier wave.

The search engine 21 consists of five components: parser 31, indexer 32, scorer 33, language promoter 34, and presenter 35. Briefly, the search engine 21 receives a search query 36 communicated via a browser 18 from a user 19, executes a search, generates search results 38, orders the search results 38 in consideration of language preferences, and sends the ordered search results 37. The search query 36 is preferably provided as a HTTP-compliant request message and the ordered search results 37 are preferably provided as HTTP-compliant response messages, as further described below respectively with reference to FIGS. 4 and 5, although other forms of request and response exchanges are feasible, as would be recognized by one skilled in the art.

In more detail, the parser 31 receives the search query 36. Each search query 36 describes potentially retrievable information, such as Web content 22. The parser 31 then parses the search query 36 into individual tokens. The tokens include header values constituting metadata 48, and an entity body containing the actual search query. The metadata 48 is copied to the language promoter 34.

The indexer 32 executes the search by evaluating the search query 36 against information characteristics maintained in a searchable data repository 49. The information characteristics are either the actual Web content 22 or metadata, such as hyperlinks, describing terms and attributes used to identify Web content. Other structures and organizations of a searchable data repository 49 are feasible, as would be recognized by one skilled in the art. Upon completing the search, the indexer 32 generates a set of search results 38 by applying the characteristics specified in the search query 36 to the stored information. Other structures and organizations of a searchable data repository 49 are feasible, as would be recognized by one skilled in the art.

Potentially, the indexer 32 can identify thousands or even millions of search results 38, so only a subset of the search results 38, typically between 100 to 10,000, are retained as the most promising search results 38. Targeted search results (not shown) can also be introduced, such as advertising or topical information content. The most promising search results 38 are then qualitatively ranked or scored by degree of match to the search query terms. The search results 38 can be numerically scored to reflect a relative quality or goodness of match. The scorer 33 assigns a numerical score 41 to each search result 38 for indicating a quality of match.

The language promoter 34 performs two primary functions. First, the language promoter 34 determines one or more preferred languages 39 and, optionally, one or more less preferred languages 40 for each search query 36, as further described below with reference to FIG. 7. In one embodiment, such preferred languages 39 may be determined using a language selector (not shown). Second, the language promoter 34 orders the search results 38 in consideration of the preferred languages 39 and, if available, the less preferred languages 40, as further described below with reference to FIG. 10. In one embodiment, such search results 38 may be ordered using a search result orderer (not shown). For efficiency, the language promoter 34 preferably orders a subset of the most promising search results 38, typically in the range of 15 to 30 search results, although other ranges could be used, as would be recognized by one skilled in the art.

In the described embodiment, the scorer 33 assigns those search results 38 having a higher degree of match a commensurately higher rank relative to other search results 38. For instance, if Spanish was a preferred language 39, those search results 38 in Spanish would have a higher degree of match than search results 38 in, say, English. However, those search results 38 in a less preferred language, such as Portuguese, could also have a higher degree of match than search results 38 in English, but lower degree of match than search results 38 in Spanish. Alternatively, a counter ranking approach could be used whereby the scorer 33 assigns those search results 38 having a higher degree of match a commensurately lower rank relative to other search results 38. Other styles, assignments or definitions of search result ranking are feasible, as would be recognized by one skilled in the art.

In another embodiment, the search results 38 are numerically scored to reflect a relative quality or goodness of match. The scorer 33 assigns a numerical score 41 to each search result 38 for indicating a relative quality of match, with higher numerical scores 41 to reflect better quality than lower numerical scores 41. For instance, if Spanish was a preferred language 39, those search results 38 in Spanish would have a higher numerical score 41 than search results 38 in, say, English. However, those search results 38 in a less preferred language, such as Portuguese, could also have a higher numerical score 41 than search results 38 in English, but lower numerical score 41 than search results 38 in Spanish. Alternatively, a counter scoring approach could be used whereby the scorer 33 assigns lower numerical scores 41 to reflect better quality than higher numerical scores 41. Other styles, assignments or definitions of search result scoring are feasible, as would be recognized by one skilled in the art.

To determine the preferred languages 39 and less preferred languages 40, the language promoter 34 evaluates search query characteristics (SQ Chars) 43, user interface characteristics (UI Chars) 44, and search result characteristics (SR Chars) 45. The search query characteristics 43 may be determined from the metadata 48. The user interface characteristics 44 may be determined from the metadata 48, and any available language preferences 42, which may be maintained by the server II (server-side) independently of each search query 36. The search result characteristics 45 may be determined from the search results 38.

The language promoter 34 orders the search results 38. In one embodiment, non-numerically ordered search results 38 are ordered by a shifting factor 46, as further describe below with reference to FIG. 11. In the described embodiment, a constant shifting factor 46 of two (2.0) is employed to demote search results 38 in non-preferred languages by two positions. This shifting factor 38 is suitable when search results 38 are ordered by decreasing degree of match to the search query 36. For example, a search result 38 in a non-preferred language occurring in the third position of a list of the search results 38 would be demoted to the fifth position. Other forms of shifting factors could be employed as well. For instance, the shifting factor 46 could promote search results 38 in non-preferred languages. As well, the shifting factor 46 could order the search results 38 by mathematical function, using, for example, additive, subtractive, multiplicative, fractional, divisional, and logarithmic factors, or may be a formula or function, as well as various combinations and arrangements thereof, as would be recognized by one skilled in the art.

In another embodiment, preferable when an adjustment formula is available for a range of numerical scores 41, numerically scored search results 38 are ordered by a weighting factor 47, as further describe below with reference to FIG. 12. Such weighting factor 47 may be a constant, mathematical function using, for example, additive, subtractive, multiplicative, fractional, divisional, and logarithmic factors, or may be a formula or function, as well as various combinations and arrangements thereof, as would be recognized by one skilled in the art. In the described embodiment, the numerical scores 41 increase with the quality of match. For example, a higher numerical score 41 reflects a better quality than lower numerical scores 41. Alternatively, a system may be employed whereby the numerical scores 41 could decrease with quality of match, as would be recognized by one skilled in the art. In the described embodiment, two weighting factors 47 are used to increase the numerical score 41 of each search result 38 depending upon whether the search result 38 is in one of the preferred languages 39 or the less preferred languages 40. For search results 38 in one of the preferred languages 39, a weighting factor $W_{LP}$ is provided by the equation:

$$w_{LP} = \left\{ \forall\, s_{1 \to n} \colon s_i = \frac{s_i + 1}{2} \right\}$$

For search results 38 in one of the less preferred languages 40, a weighting factor $W_{LPL}$ is provided by the equation:

$$w_{LPL} = \left\{ \forall\, s_{1 \to n} \colon s_i = \frac{(s_i \times 2) + 1}{3} \right\}$$

These weighting factors are most suitable when numerical scores 41 range between 0.0 and 1.0 and are approximately uniformly distributed. In the described embodiment, the search results 38 having a given score $s_i$ are promoted more when associated with one of the preferred languages 39 than when associated with one of the less preferred languages 40. However, the search results 38 associated with one of the less preferred languages 40 could instead be promoted more than the search results 38 associated with one of the preferred languages 39, as would be recognized by one skilled in the art. Alternatively, weighting factors 47 could be used to decrease the numerical score 41 of each search result 38 depending upon whether the search result 38 is in one of the preferred languages 39 or the less preferred languages 40. Other ranges of numerical scores and forms of weighting factors could be employed as well, as would be recognized by one skilled in the art.

In a further embodiment, the shifting factor 46 and the weighting factor 47 can be adjusted to accommodate less or more reliable dynamic preferred language determination. For instance, a short search query 36 or sparse search results 37 might lower the accuracy of the dynamic preferred language determination due to less context with which to work. The shifting factor 46 and the weighting factor 47 would be relaxed to less aggressively order the search results 37 Alternatively, a long search query 36 or lengthy search results 37 might increase the accuracy and the shifting factor 46 and the weighting factor 47 would be increased to more aggressively order the search results 37.

Finally, the presenter 35 presents the ordered search results 37 to the user 19 via the browser 18. Typically, only a part of the ordered search results 37 need be presented since the full set of ordered search results 37 can exceed available presentation space on the browser 18. Presentation is the communication of the ordered search results 37 by means of a search result response message.

Search Query Execution and Search Results Processing

Figure 3:
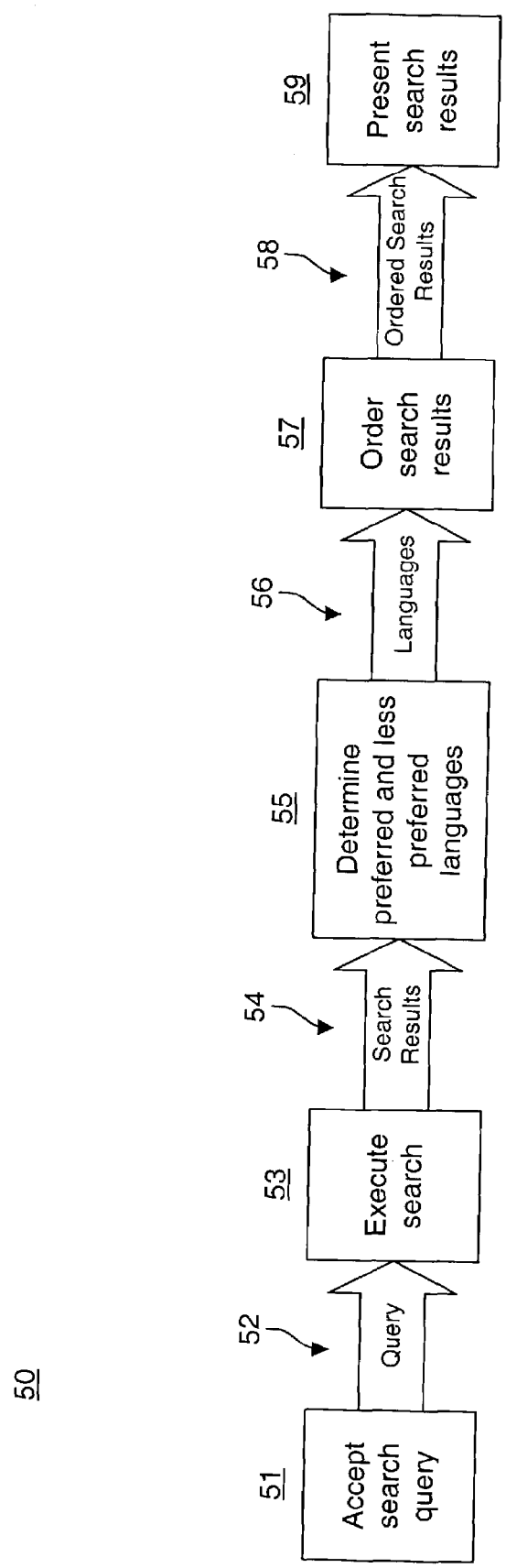
FIG. 3 is a process flow diagram showing search query execution and search results processing by the search engine of FIG. 1.

FIG. 3 is a process flow diagram 50 showing search query execution and search results processing by the search engine 21 of FIG. 1. The process flow proceeds in five primary phases. First, a search query 52 is accepted and parsed (process 51) and is forwarded to the next phase. A search is executed (process 53) against a stored data repository and search results 54 are forwarded to the next phase. The preferred and less preferred languages 56 of the user 19 are determined (process 55) based on metadata and available context. The preferred and less preferred languages 56 are forwarded to the next phase for use in ordering the search results 54 (process 57). In the final phase, the ordered search results 58 are forwarded and presented (process 59). The phases of determining the preferred and less preferred languages (process 55) and ordering the search results (process 57) enhance the quality of the search results by tailoring the search results in accordance with dynamically determined user language preferences.

Request Message Structure

Figure 4:
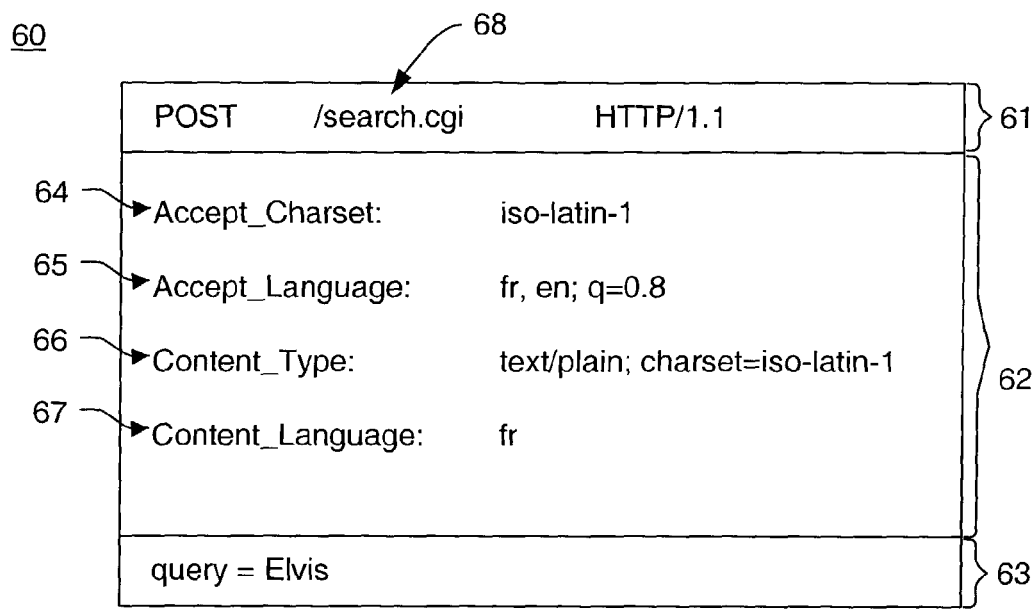
FIG. 4 is a data structure diagram showing, by way of example, a request message for receipt by the search engine of FIG. 1.

FIG. 4 is a data structure diagram showing, by way of example, a request message 60 for receipt by the search engine 21 of FIG. 1. The request message 60 is an HTTP-compliant request message, such as described in D. Gourley and E. Totty, "HTTP, the Definitive Guide," Ch. 3, pp. 43-73, O'Reilly and Assocs., Sebastopol, Calif. (2002), the disclosure of which is incorporated by reference. The request message 60 consists of three parts: start line 61, headers 62, and entity body 63. The start line 61 identifies an HTTP method, such as, "POST," which sends input data from the browser 18 to the search engine 21. The start line 61 also includes a request Uniform Resource Locator (URL) 68 and HTTP version identifier. The exemplary request URL, "/search.cgi," identifies a search request.

The headers 62 consist of zero or more MIME-compliant name and value pairings, which provide the metadata 48 describing the characteristics of the interface of the browser 18 and the entity body 63, that is, the search query itself. Four MIME-compliant headers provide metadata 48 instrumental in determining those languages acceptable to a requesting user, as follows:

(1) Accept_Charset (64): Indicates the character sets that are acceptable or preferred by the requesting browser 18, for instance, ISO-Latin-1, an eight-bit extension to ASCII that supports Western European languages. ISO-Latin-1 is also known as ISO-8859-1.

(2) Accept_Language (65): Indicates the languages that are acceptable or preferred by the user 19, in order of preference and optionally including a quality factor q, for instance, strong preference for French (fr) and lesser preference for English (en).

(3) Content_Type (66): Describes the media type of the entity body 63, for instance, plain text (text/plain) and can indicate the character sets used to encode the entity body 63, for instance, ISO-Latin-1, as a parameter.

(4) Content_Language (67): Indicates the natural language in which the entity body 63 is expressed, for instance, French (fr).

Other forms of request message formats using equivalent or related protocols and providing similar information as the forgoing headers 62, as well as other headers and parameters, are feasible, as would be recognized by one skilled in the art.

Response Message Structure

Figure 5:
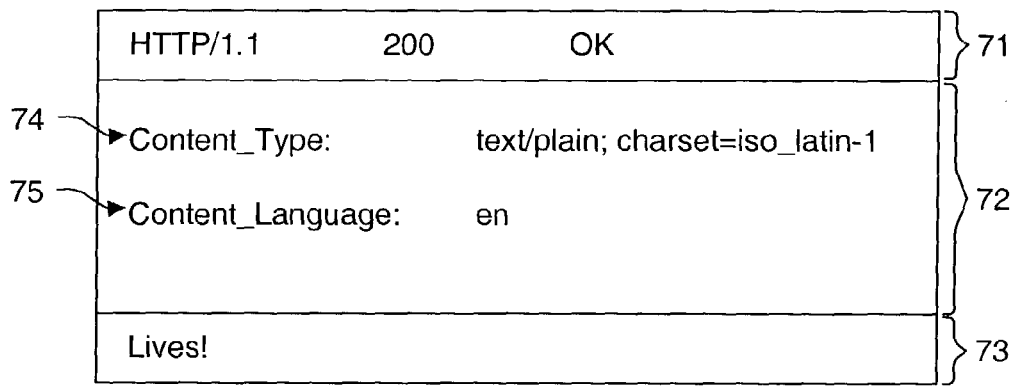
FIG. 5 is a data structure diagram showing, by way of example, a response message for dispatch by the search engine of FIG. 1.

FIG. 5 is a data structure diagram showing, by way of example, a response message 70 for dispatch by the search engine 21 of FIG. 1. The response message 70 is an HTTP-compliant response message, such as described in D. Gourley and E. Totty, Id., the disclosure of which is incorporated by reference. The response message 70 also consists of three parts: start line 71, headers 72, and entity body 73. The start line 71 includes an HTTP identifier, response status code, and human-readable reason phrase.

The headers 72 consist of zero or more MIME-compliant name and value pairings, which provide the metadata describing the characteristics of the entity body 73, that is, each search result. Two MIME-compliant headers provide metadata instrumental in determining those languages acceptable to a requesting user, as follows:

(1) Content_Type (74): Describes the media type of the entity body 73, for instance, plain text (text/plain) and indicates the character sets used to encode the entity body 73, for instance, ISO-Latin-1, as a parameter.

(2) Content_Language (75): Indicates the natural language in which the entity body 73 is expressed, for instance, English (en).

Other forms of response message formats using equivalent or related protocols and providing similar information as the forgoing headers 72, as well as other headers and parameters, are feasible, as would be recognized by one skilled in the art.

Method Overview

Figure 6:
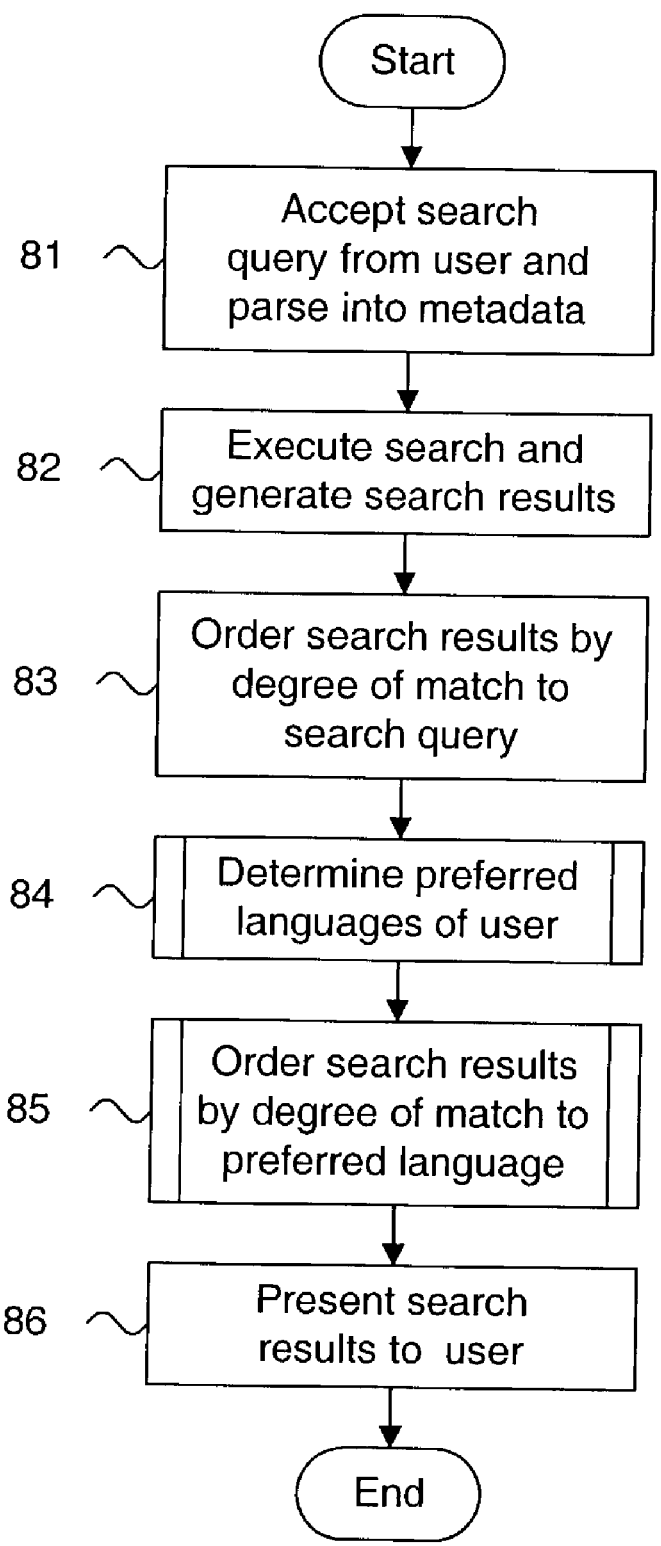
FIG. 6 is a flow diagram showing a method for providing preferred language ordering of search results, in accordance with the present invention.

FIG. 6 is a flow diagram showing a method 80 for providing preferred language ordering of search results 38, in accordance with the present invention. The method 80 is described as a sequence of process operations or steps, which can be executed, for instance, by a search engine 21 (shown in FIG. 1).

A search query 36 is accepted from a user 19 and parsed into metadata 48 (block 81). A search is executed on a searchable data repository 49 by evaluating the search query 36 against information characteristics maintained in the searchable data repository 49 and search results 38 are generated (block 82). Since thousands or even millions of search results 38 can potentially be generated, only a subset of the search results 38, typically between 100 to 10,000, are retained as the most promising search results 38. Targeted search results (not shown) can also be introduced, such as advertising or topical information content. Prior to providing the search results 38 to the browser 18, the search results 38 can be temporarily staged as "raw" Web pages, structured data, or unstructured data, from which metadata describing the characteristics of each search result 38 can be extracted, as is known in the art. The search results 38 are qualitatively ordered by degree of match to the search query 36 (block 83) to provide a ranking or scoring, including a numerical score 41, reflecting search result quality, as described above with reference to FIG. 2.

Up to this point, the search results 38 have been identified and ranked or scored. The preferred languages 39, as well as the less preferred languages 40, of the requesting user 19 are then determined (block 84), as further described below with reference to FIG. 7. The search results 38 are then ordered by degree of match to the preferred languages 39 and, if identified, less preferred languages 40 (block 85), as further described below with reference to FIG. 10. For efficiency, preferably only a subset of the most promising search results 38, typically in the range of 15 to 30 search results, are ordered, although other ranges could be used, as would be recognized by one skilled in the art. Finally, the ordered search results 37 are presented via the browser 18. Typically, only a part of the ordered search results 37 need be presented since the full set of ordered search results 37 can exceed available presentation space on the browser 18. In the described embodiment, the search query 36 is provided as an HTTP-compliant request message 60 and each search result is provided back to the user 19 as an HTTP-compliant response message 70.

In a further embodiment, the preferred languages 39 and less preferred languages 40 are stored for future use while executing search queries 36 from the same requesting user 19. As well, the ability to present the ordered search results 37 using preferred language ordering could be controlled by enabling or disabling presentation in the preferred languages 39 and, if available, the less preferred languages 40, using a "toggle" provided via the user interface. In a still further embodiment, the ordered search results 37 are grouped together in each of the preferred languages 39 and, if available, the less preferred languages 40, prior to presentation to the requesting user 19. Alternatively, the ordered search results 37 in the preferred languages 39 and, if available, the less preferred languages 40 can be arranged for presentation next to those search results in non-preferred languages, such as by using adjacent columns or cells in a table. The routine then terminates.

Determining Preferred Languages

Figure 7:
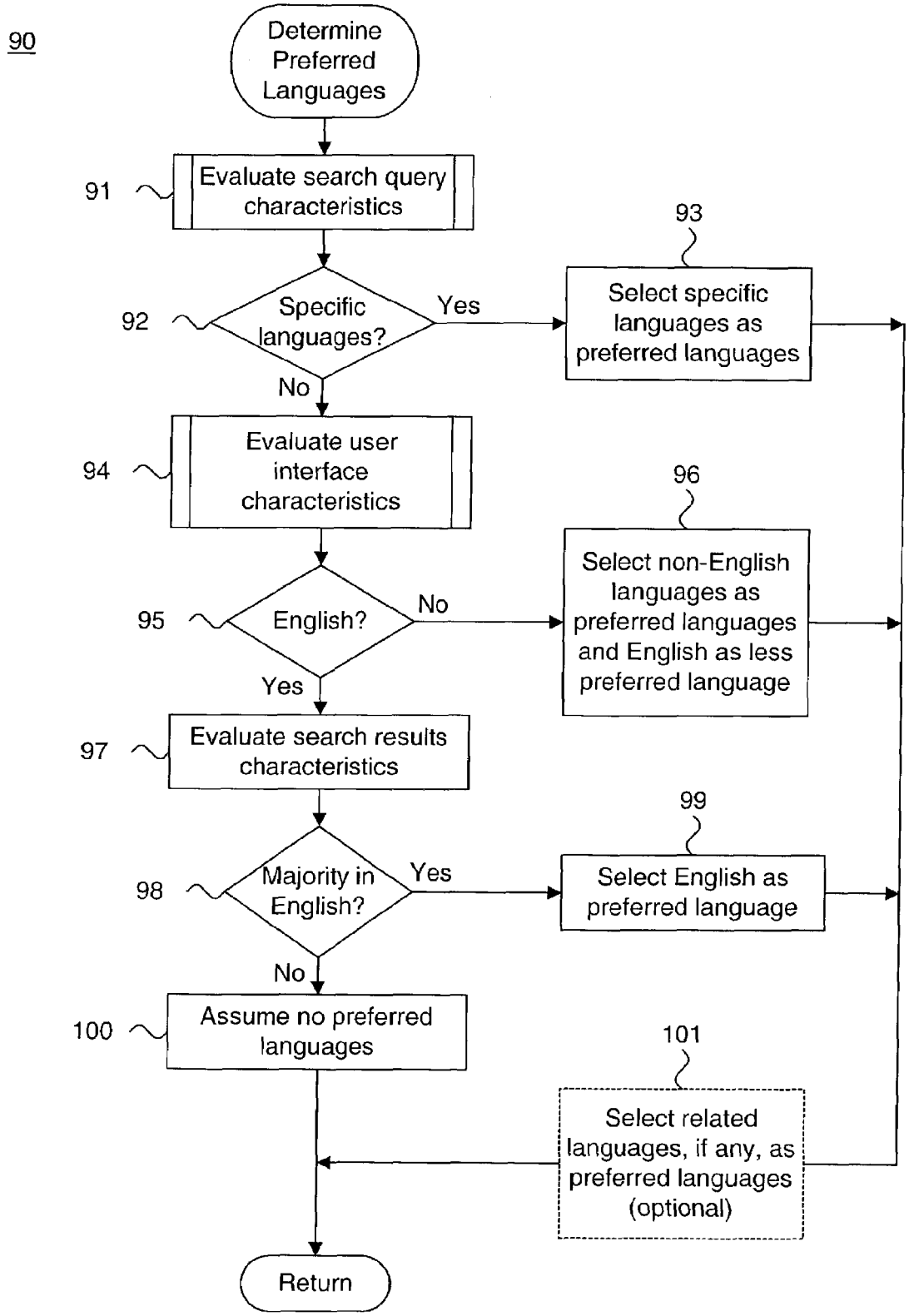
FIG. 7 is a flow diagram showing the routine for determining preferred languages for use in the method of FIG. 6.

FIG. 7 is a flow diagram showing the routine 90 for determining preferred languages 39 for use in the method 80 of FIG. 6. The purpose of this routine is to determine the preferred languages 39 and any less preferred languages 40 of the requesting user 19 based on search query characteristics 43, user interface characteristics 44, and search result characteristics 45.

First, the search query characteristics 43 are evaluated (block 91) based on the metadata 48 parsed from the search query 36, as further described below with reference to FIG. 8. If specific languages can be determined based on the search query characteristics 43 (block 92), the specific languages are selected as the preferred languages 39 (block 93).

Next, if no specific languages can be determined from the search query characteristics 43 (block 92), the user interface characteristics 44 are evaluated (block 94), as further described below with reference to FIG. 9. If the user interface does not define English as an accepted language (block 95), each non-English language is selected as a preferred language 39 and English is selected as a less preferred language 40 (block 96).

Next, if English is provided as the accepted language of the user interface (block 95), the search results characteristics 45 are evaluated (block 97). In the described embodiment, the search results 38 are provided in one of two formats. First, the search results 38 can be grouped as a collection of "raw" Web pages from which language characteristics can be determined. Second, the search results 38 can be organized into metadata describing the various characteristics, including language characteristics, and content of the Web pages corresponding to the search results 38. The predominant language of each search result 38 can be dynamically determined through content analysis, such as described in U.S. Pat. No. 6,167,369, issued Dec. 26, 2000 to Schulze, the disclosure of which is incorporated by reference. If a majority of the search results 38 are in English (block 98), English is selected as a preferred language 39 (block 99). Otherwise, no preferred languages 39 or less preferred languages 40 are assumed (block 100) and the routine returns.

For each instance in which one or more preferred language 39 has been selected (blocks 93, 96 and 99), related languages, if any, can optionally be selected as additional preferred languages 39 (block 101). Related language include those languages and dialects sharing a common basis whereby users proficient in one such language are able to comprehend, perhaps with only slight difficulty, related languages. For instance, a user proficient in Spanish can often comprehend information provided in Portuguese. Following any additions to the preferred languages 39, the routine returns.

Evaluating Search Query Characteristics

Figure 8:
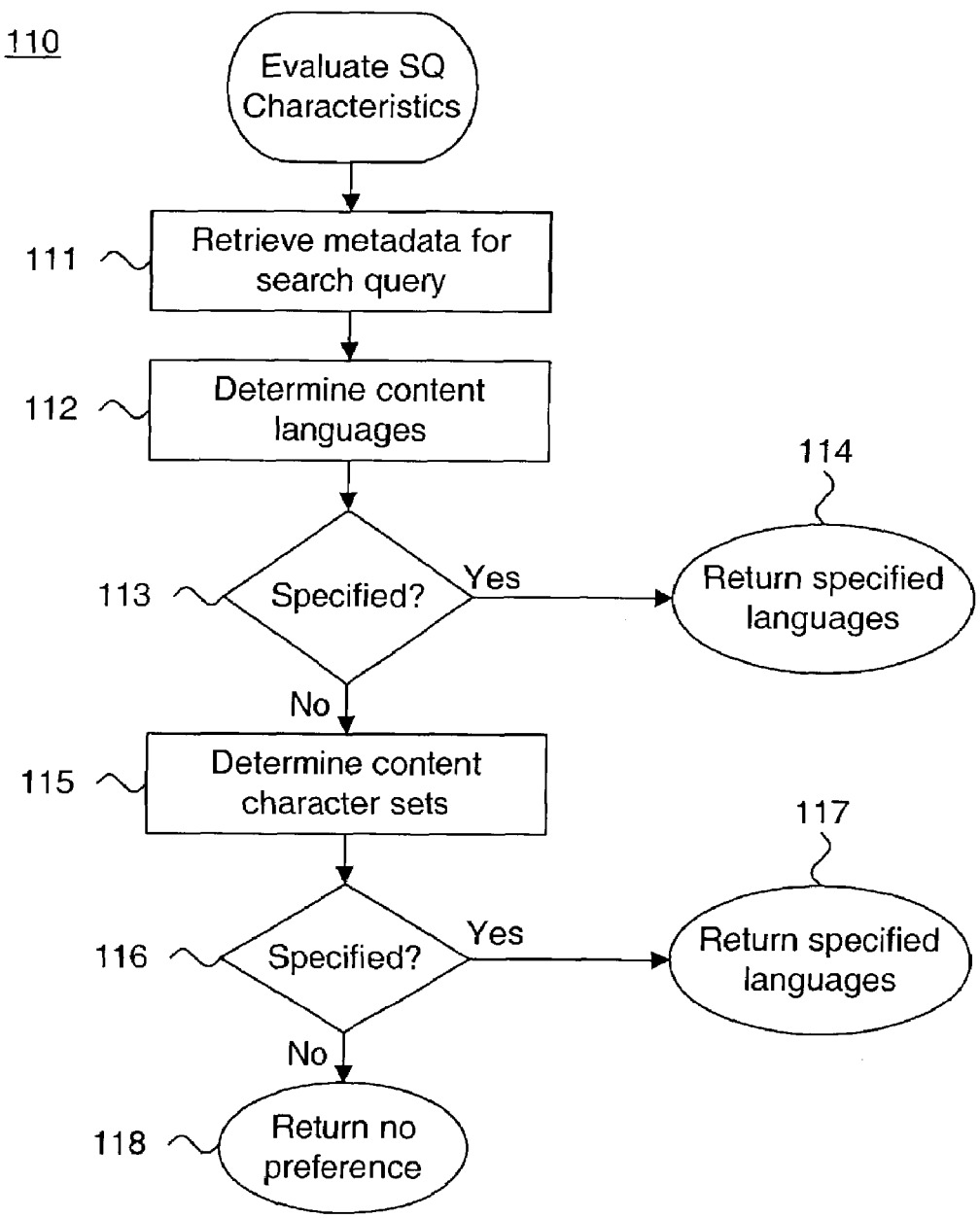
FIG. 8 is a flow diagram showing the function for evaluating search query characteristics for use in the routine of FIG. 7.

FIG. 8 is a flow diagram showing the function 110 for evaluating search query characteristics 43 for use in the routine 90 of FIG. 7. The purpose of this function is to determine any preferred languages 39 based on available metadata 48 parsed from the headers 62 of the search query request message 60.

First, any available metadata 48 corresponding to the headers 62 of the search query request message 60 are retrieved (block 111). The languages of the content provided in the entity body 63 are determined (block 112) by evaluating the parameters of the Content_Language header 67. If specified (block 113), the specified languages are returned (block 114). Otherwise, the character sets of the content provided in the entity body 63 are determined (block 115) by evaluating the Content_Type header 66. If specified as language-specific character sets (block 116), the specified languages are returned (block 117). For example, the ISO-2022-JP is a Japanese-specific character set. Otherwise, no language preferences are returned (block 118).

Evaluating User Interface Characteristics

Figure 9:
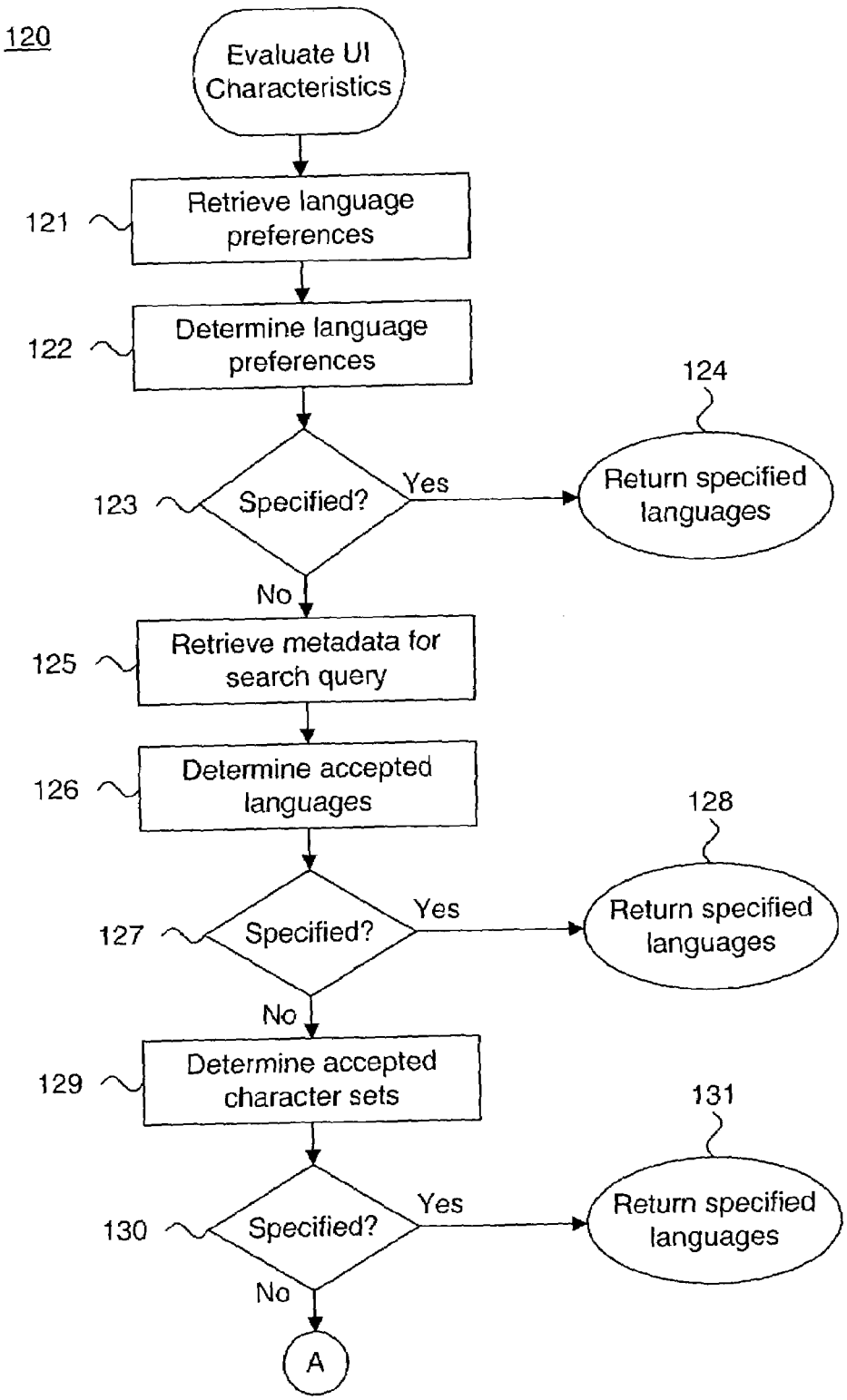
FIG. 9 is a flow diagram showing the function for evaluating user interface characteristics for use in the routine of FIG. 7.
Figure 9:
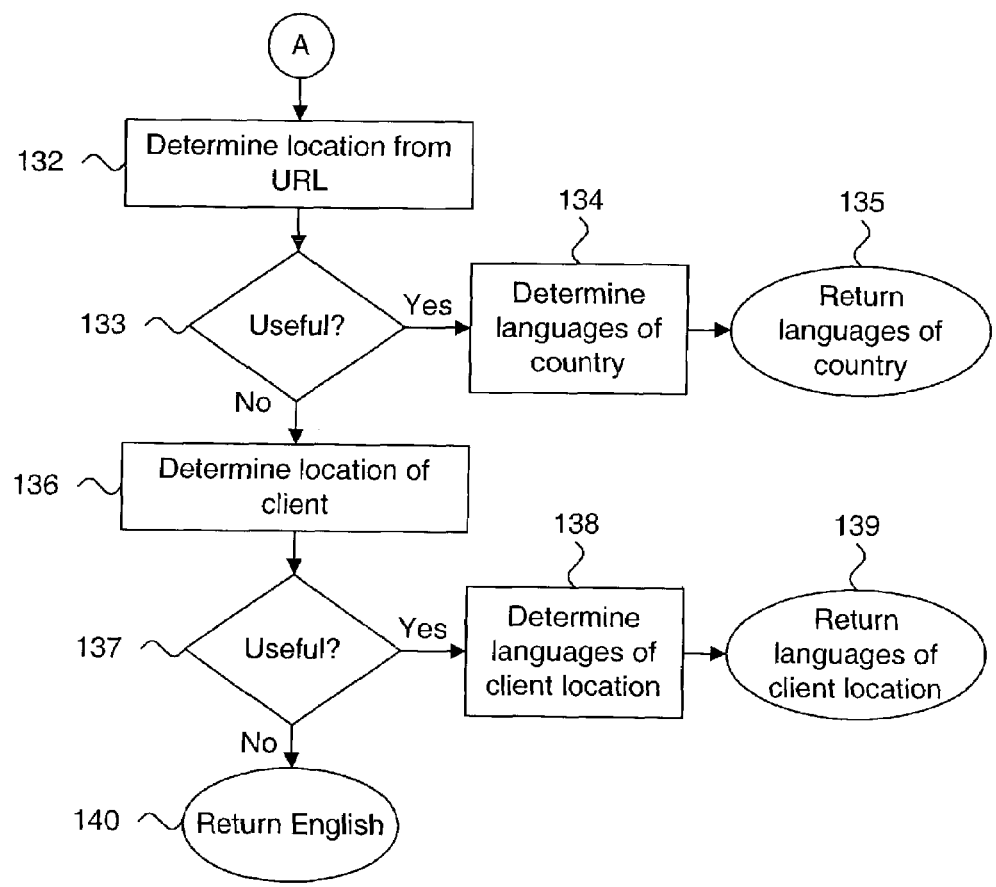

FIG. 9 is a flow diagram showing the function 120 for evaluating user interface characteristics 44 for use in the routine 90 of FIG. 7. The purpose of this function is to determine any preferred languages 40 based on user interface characteristics.

The user interface is generated by the search engine 21 and express language preferences can often be specified as user options. Thus, any available language preferences are first retrieved (block 122). Server-side language preferences are maintained either directly in a cookie stored at the client, or by the search engine 21 and accessed using cookies or log-in procedures to uniquely identify each requesting user 19. If available, the appropriate language identifying cookie is retrieved, or the appropriate user log-in procedure is performed. The stored language preference are retrieved and used to determine any server-side language preferences (block 122). If specified (block 123), the specified languages are returned (block 124).

Browsers 18 can limit the languages in which search results 38 are accepted as client-side language preferences. Thus, any available metadata 48 corresponding to the headers 62 of a search query request message 60 are retrieved (block 125) and the languages accepted by the user interface of the browser 18 are determined (block 126) by evaluating the Accept_Language header 65. In addition to specifying accepted languages, the Accept_Language header 65 can include a quality factor q that indicates a degree of language preference on a scale of 0.0 through 1.0. If specified (block 127), the specified languages are returned (block 120) with those languages having a quality factor q less than 1.0 being specified as less preferred languages 40.

If no accepted languages for the user interface of the browser 18 are specified (block 127), the character sets accepted by the user interface of the browser 18 are determined (block 128) by evaluating the Accept_Charset header 64. If specified as language-specific character sets (block 130), the specified languages are returned (block 131).

Otherwise, no language preferences can be determined by either server-side or client-side language preferences. However, a language preference might still be determinable based on information available in the URL 68 and the client location. The location of the IP domain identified in the URL 68 is determined (block 132). For example, a URL 68 specified as "www.acme.at" has an IP domain of ".at," which indicates an Austrian IP domain. However, certain IP domains, such as ".com," are so widely-used that no useful language preference inferences can be drawn. If the URL 68 provides a useful IP domain (block 133), the languages of the country to which the IP domain is assigned is determined (block 134) and returned (135). If not useful (block 133), the location of the client 12 from which the search query 36 was sent is determined (block 136) by evaluating a Client_IP parameter, which can be parsed from the header of the Transmission Control Protocol (TCP) packet within which the search query 36 was sent. The Client_IP parameter provides an IP address, which is a 32-bit numeric address written as four numbers separated by periods. An IP domain can be determined by a Domain Name Service lookup of the last number in the IP address. Again, if useful in inferring a language preference (block 137), the languages of the IP domain are determined (block 138) and returned (block 139). In the described embodiment, the predominant language for the domain specified in the IP address of the client 12 is selected. Otherwise, if no IP address is provided (block 137), English is returned (block 140).

Ordering Search Results

Figure 10:
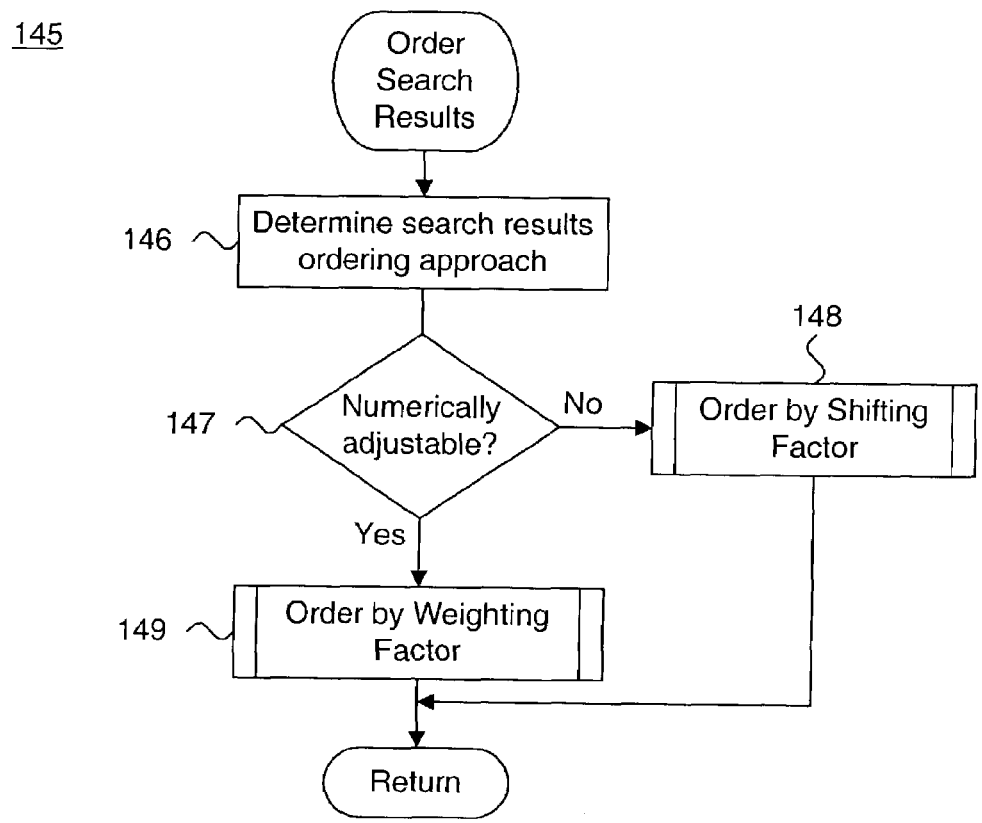
FIG. 10 is a flow diagram showing the routine for ordering search results for use in the method of FIG. 6.

FIG. 10 is a flow diagram showing the routine 145 for ordering search results 38 for use in the method 80 of FIG. 6. The purpose of this routine is to order the search results 38 based on the ranking or ordering method used, if any, by the search engine 21 in consideration of the preferred languages 39 and, if available, the less preferred languages 40.

First, the approach utilized by the search engine 21 to rank or order the search results 38 is determined (block 146). If the numerical scores 41 assigned to the search results 38 are suitable for numerical adjustment (block 147), a numerical scoring approach is utilized, whereby the search results 38 are ordered using a weighting factor 47 (block 149), as further described below with reference to FIG. 12. Otherwise, the search results 38 are ordered by using a shifting factor 26 (block 148), as further described below with reference to FIG. 11. The routine then returns.

Ordering Search Results by a Shifting Factor

Figure 11:
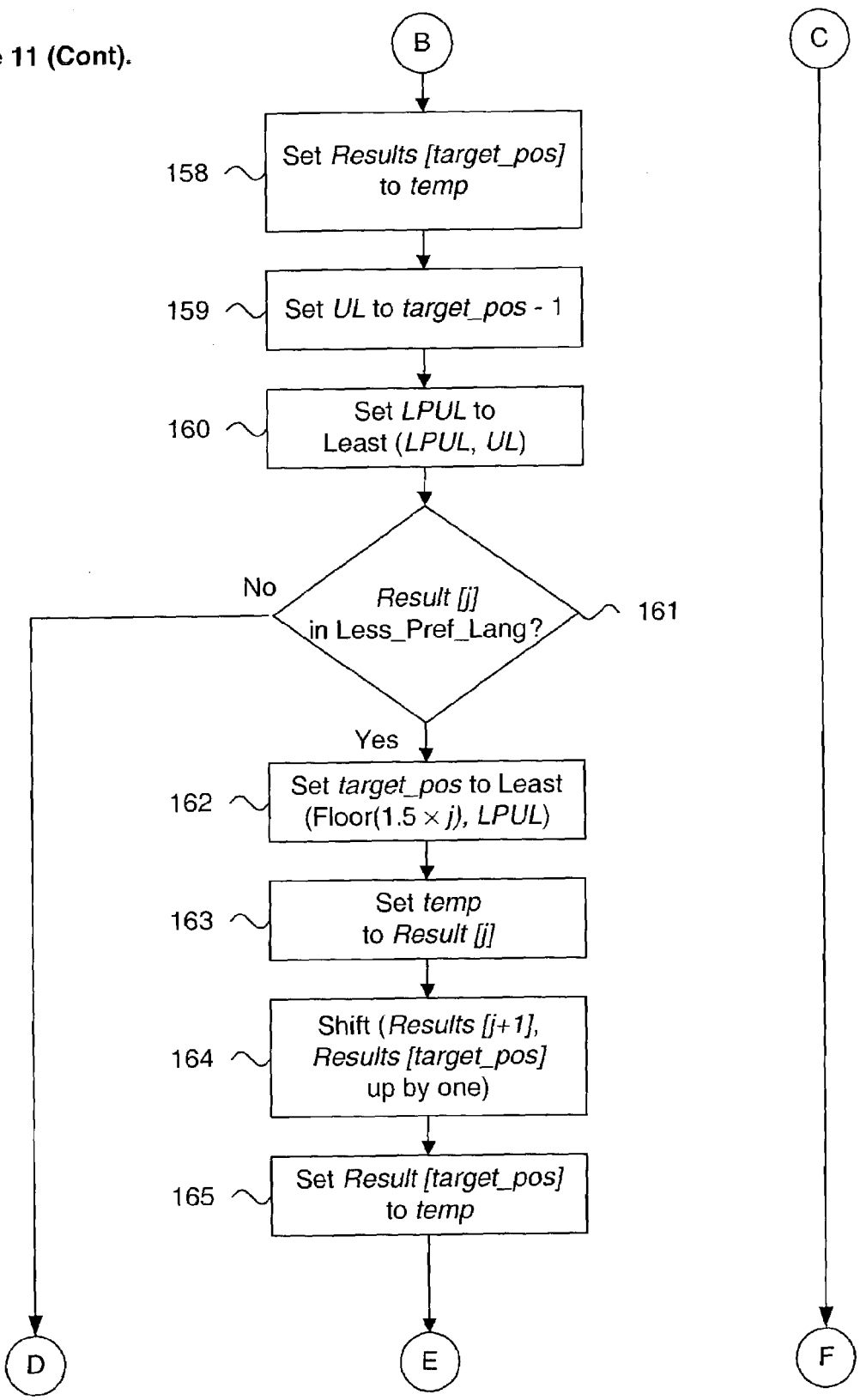
FIG. 11 is a flow diagram showing the routine for ordering search results by a shifting factor for use in the routine of FIG. 10.
Figure 11:
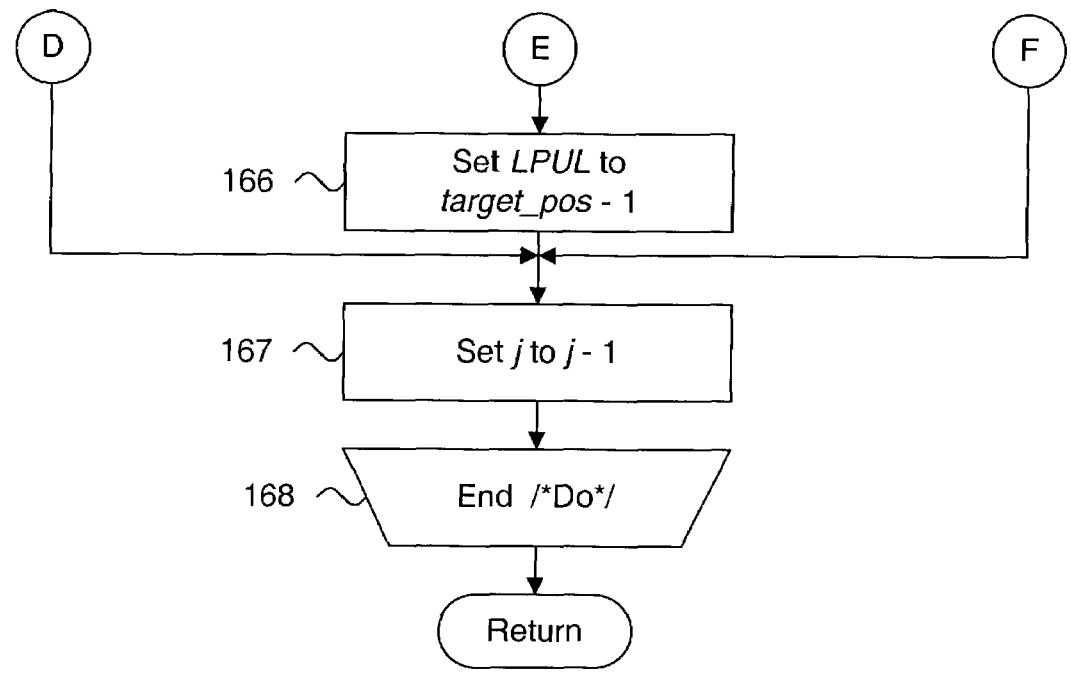

FIG. 11 is a flow diagram showing the routine 150 for ordering search results 38 by a shifting factor 46 for use in the routine 130 of FIG. 9. The purpose of this routine is to shift search results 38 in a non-preferred language down in relation to search results 38 in a preferred language 39 or less preferred language 40. In the described embodiment, a constant shifting factor 46 of two (2.0) is employed to demote search results 38 in non-preferred languages by two positions. This shifting factor 38 is suitable when search results 38 are ordered by decreasing degree of match to the search query 36. For example, a search result 38 in a non-preferred language occurring in the third position of a list of the search results 38 would be demoted to the fifth position. Other forms of shifting factors could be employed as well. For instance, the shifting factor 46 could promote search results 38 in non-preferred languages. As well, the shifting factor 46 could order the search results 38 by mathematical functions, including additive, subtractive, multiplicative, fractional, divisional, and logarithmic factors, as well as various combinations and arrangements thereof, as would be recognized by one skilled in the art.

On one embodiment, the routine operates on a subset less than or equal to the total number of search results 38, although other forms of subset selection criteria could be used, as would be recognized by one skilled in the art. A variable n is set to the number of search results to be displayed to the user 19, while an upper limit UL for preferred language 39 and an upper limit for less preferred languages LPUL are both set to the lesser of the number of search results 38, n, and twice n (block 151). The search results 38 are then ordered in an iterative processing loop (blocks 153-166) as follows. First, an index j is set to the upper limit UL (block 152) and processing is performed while the index j is positive (block 153). The search results are maintained in an array Result[]. If Result [j] is not in a preferred language Pref_Lang and Result [j] is not in a less preferred language Less_Pref_Lang (block 154), Result [j] is demoted by the shifting factor 46, as follows. A variable target_pos is set to the lesser of twice j and upper limit UL (block 155) and a temporary variable, temp, is set to Result [j] (block 156). The remaining search results 38 are promoted by shifting Results [j+1] through Results [target_pos] up by one (block 157) and Result [target_pos] is set to temp (block 158). The upper limit UL is set to target_pos minus one (block 159) and the less preferred upper limit LPUL is set to the lesser of the less preferred upper limit LPUL and upper limit UL (block 160).

If Result [j] is in a less preferred language Less_Pref Lang (block 161), Result [j] is demoted by the shifting factor 46, as follows. The variable target_pos is set to the lesser of the floor of 1.5 times j and the less preferred upper limit LPUL (block 162) and a temporary variable, temp, is set to Result [j] (block 163). The remaining search results 38 are shifted by promoted Results [j+1] through Results [target_pos] up by one (block 164) and Result [target_pos] is set to temp (block 165). The less preferred upper limit (LPUL) is set to target_pos minus one (block 166).

Finally, the index j is set to j minus one (block 167) and processing continues with the next loop iteration (block 168), after which the routine returns.

Ordering Search Results by a Weighting Factor

Figure 12:
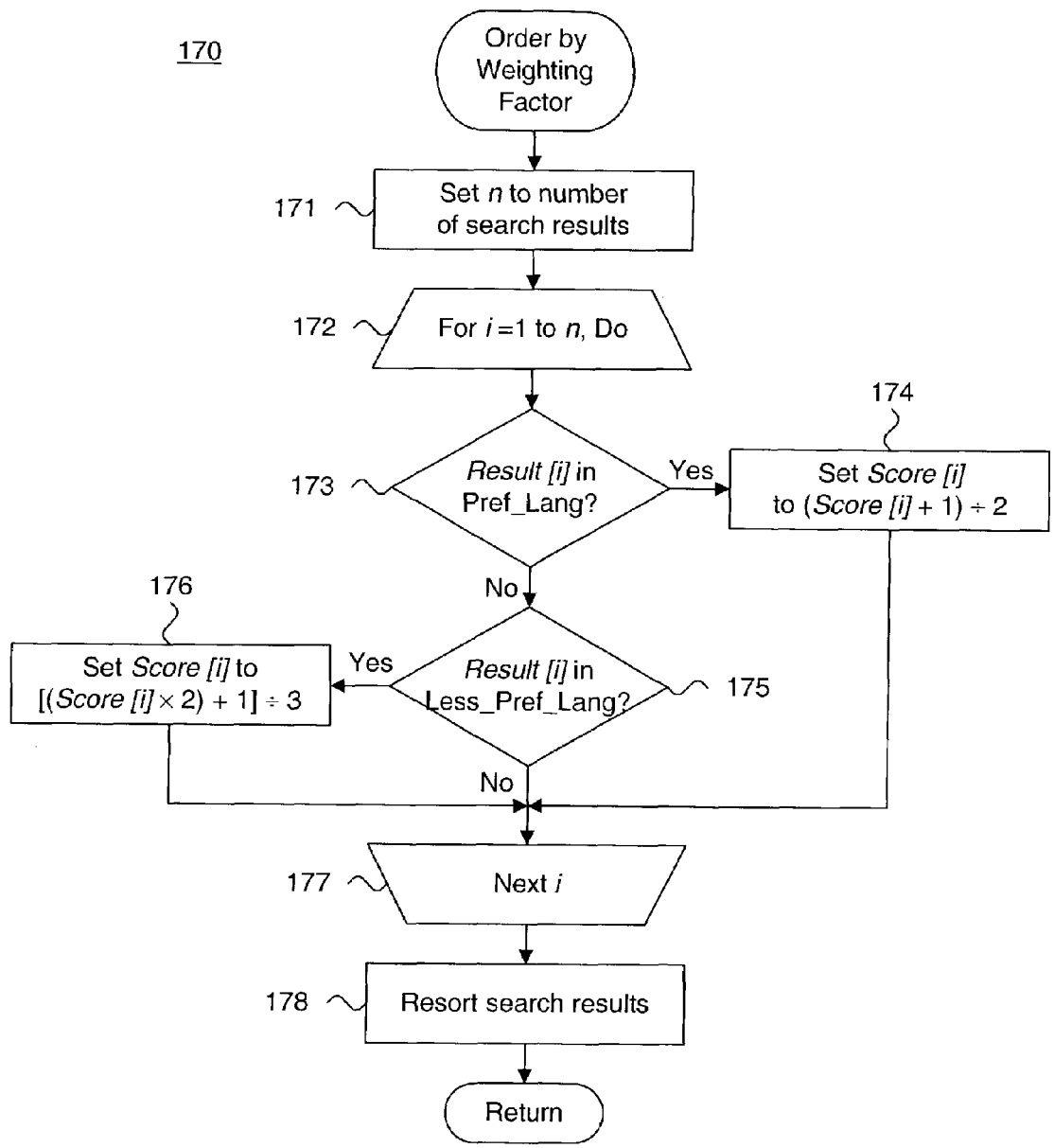
FIG. 12 is a flow diagram showing the routine for ordering search results by a weighting factor for use in the routine of FIG. 10.

FIG. 12 is a flow diagram showing the routine 170 for ordering search results 38 by a weighting factor 47 for use in the routine 130 of FIG. 9. The purpose of this routine is to order the search results 38 by recalculating the numerical score 41 assigned to each search result 38 to favor those search results in either one of the preferred languages 39 or less preferred languages 40. On one embodiment, the routine operates on a subset less than or equal to the number of search results 38, which equals the number of search results 38 to be displayed to the user multiplied by a margin, for instance, 2 or 3, although other forms of subset selection criteria could be used, as would be recognized by one skilled in the art.

In the described embodiment, the numerical scores 41 increase with the quality of match. For example, a higher numerical score 41 reflects a better quality than lower numerical scores 41. Alternatively, a system may be employed whereby the numerical scores 41 could decrease with quality of match, as would be recognized by one skilled in the art. In the described embodiment, two weighting factors 47 are used to increase the numerical score 41 of each search result 38 depending upon whether the search result 38 is in one of the preferred languages 39 or the less preferred languages 40. For search results 38 in one of the preferred languages 39, a weighting factor WLP is provided by the equation (1):

$$w_{LP} = \left\{ \forall\, s_{1 \to n} \colon s_i = \frac{s_i + 1}{2} \right\} \quad (1)$$

For search results 38 in one of the less preferred languages 40, a weighting factor $w_{LPL}$ is provided by the equation (2):

$$w_{LPL} = \left\{ \forall\, s_{1 \to n} \colon s_i = \frac{(s_i \times 2) + 1}{3} \right\} \quad (2)$$

These weighting factors are most suitable when numerical scores 41 range between 0.0 and 1.0 and are approximately uniformly distributed. In the described embodiment, the search results 38 having a given score $s_i$ are promoted more when associated with one of the preferred languages 39 than when associated with one of the less preferred languages 40. However, the search results 38 associated with one of the less preferred languages 40 could instead be promoted more than the search results 38 associated with one of the preferred languages 39, as would be recognized by one skilled in the art. Alternatively, weighting factors 47 could be used to decrease the numerical score 41 of each search result 38 depending upon whether the search result 38 is in one of the preferred languages 39 or the less preferred languages 40. Other ranges of numerical scores and forms of weighting factors could be employed as well, as would be recognized by one skilled in the art.

The routine operates on a subset less than or equal to the total number of search results 38 and recalculates the numerical scores 41 through an iterative processing loop (blocks 172-177) as follows. A variable n is set to the number of search results to be multiplied by a margin, for instance 2 or 3 (block 171). The search results 38 are maintained in an array Results[]. The numerical score 41 for each search result 38 is recalculated in the iterative processing loop (blocks 172-177) indexed by a variable i. During each iteration (block 172), if Result [i] is in a preferred language Pref_Lang (block 173), Score [i] is set to half the quantity Score[i] plus one (block 167), that is, Equation (1). Otherwise, if Result [i] is in a less preferred language Less_Pref_Lang (block 175), Score[i] is set to one-third the quantity two times Score[i] plus one (block 176), that is, Equation (2). Otherwise, no numerical score adjustment is required. Processing continues with the next iteration (block 177). After all iterations, the search results 38 are resorted (block 178), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A method, comprising:
   receiving, from a user, a search query;
   performing a search based on the search query to identify search results in a plurality of search result languages;
   identifying a particular language for the search results based on characteristics of the search query, characteristics of a user interface via which the search query is received, and characteristics of the search results;
   ordering the search results to create an ordered list of search results;
   determining whether the search results in the ordered list of search results are in the particular language;
   adjusting the ordering of one of the search results among other ones of the search results to create an adjusted list of search results when the one of the search results is in the particular language;
   presenting the adjusted list of search results; and
   permitting the user to toggle between presentation of the adjusted list of search results and the ordered list of search results.

2. A method according to claim 1, where identifying the particular language includes:
   determining the particular language based on the search query by evaluating at least one of a language used in the search query or a character encoding used in the search query.

3. A method according to claim 1, where identifying the particular language includes:
   determining the particular language using the characteristics of the user interface when the particular language cannot be determined based on the search query.

4. A method according to claim 3, where identifying the particular language using the characteristics of the user interface includes:
   evaluating, to identify the particular language, at least one of a predetermined language specified as a stored preference independent of the search query, a language specified by the user interface, a character encoding specified by the user interface, or a network address of a client application from which the search query was submitted.

5. A method according to claim 1 where identifying the particular language includes:
   determining the particular language using at least some of the search results when the characteristics of the user interface identify the particular language as a predetermined language.

6. A method according to claim 5, where identifying the particular language includes:
   evaluating a language used in a majority of the search results to identify the particular language.

7. A method according to claim 1, where adjusting the ordering of the one of the search results includes at least one of:
   demoting each search result in a language other than the particular language and promoting each search result in the particular language by at least one position within the ordered list of search results; or
   promoting each search result in a language other than the particular language and demoting each search result in the particular language by at least one position within the ordered list of search results.

8. A method according to claim 1, further comprising:
   assigning a numerical score to the search results; and
   adjusting the numerical score of at least some of the search results in the particular language.

9. A method according to claim 8, further comprising at least one of:
   increasing the numerical score assigned to the search results in the particular language and maintaining the numerical score assigned to the search results in a language other than the particular language; or decreasing the numerical score assigned to the search results in the particular language and maintaining the numerical score assigned to the search results in a language other than the particular language.

10. A method according to claim 8, where adjusting the ordering of the at least one of the search results includes:
sorting the at least some of the search results with the adjusted numerical scores.

11. A method according to claim 1, further comprising:
identifying a second language that is different than the particular language;
determining whether the search results in the ordered list of search results are in the second language; and
adjusting the ordering of a particular one of the search results among other ones of the search results when the particular one of the search results is in the second language.

12. A system implemented within a computing device, comprising:
a memory to store instructions for implementing:
a parser receiving a search query from a user;
an indexer:
executing a search based on the search query, and
identifying search results in a plurality of languages based on the search; and
a language promoter:
identifying a particular language applicable to the search results based on characteristics of the search query, characteristics of a user interface from which the search query is received, and characteristics of the search results,
ordering the search results to create an ordered list of search results, and
adjusting the ordering of at least one of the search results among other ones of the search results to create an adjusted list of search results based on whether the at least one of the search results is in the particular language; and
a presenter permitting the user to toggle between presentation of the adjusted list of search results and the ordered list of search results; and
a processor to execute the instructions in the memory.

13. A system according to claim 12, where the memory further stores instructions for implementing:
a search query characterizer determining at least one of a character encoding or a language used in the search query; and
a language selector selecting at least one language corresponding to the at least one of the character encoding or the language as the particular language.

14. A system according to claim 12, where the memory further stores instructions for implementing:
a user interface characterizer determining a language used by the user interface; and
a language selector selecting the language used by the user interface as the particular language.

15. A system according to claim 14, where:
the user interface characterizer determines the language used by the user interface based on at least one of the network address of a client from which the search query was submitted, at least one of an accepted language or a character set of the client, or a predetermined language specified as a stored preference independent of the search query.

16. A system according to claim 12, where the memory further stores instructions for implementing:

a user interface characterizer determining a default language used by the user interface; and
a language selector selecting a language other than the default language as the particular language, and selecting the default language as a second language.

17. A system according to claim 16, where the memory further stores instructions for implementing:
a search results characterizer determining at least one search result language for at least one search result; and
the language selector selecting the at least one search result language as the particular language.

18. A system according to claim 17, wherein the at least one search result language is used in a majority of the search results.

19. A system according to claim 12, where the memory further stores instructions for implementing:
a search result orderer ordering the search results based on a match of a language of the search results to the particular language.

20. A system according to claim 12, where the memory further stores instructions for implementing:
a search result orderer ordering the search results by degree of match of a language of the search results to the particular language.

21. A system according to claim 20, where: the search result orderer demotes the search results in a language other than the particular language by a predefined shifting factor.

22. A system according to claim 21, wherein the predefined shifting factor substantially equals two (2.0).

23. A system according to claim 20, where:
the search result orderer promotes the search results in a language other than the particular language by a predefined shifting factor.

24. A system according to claim 12, where the memory further stores instructions for implementing:
a scorer ordering each of the search results by a degree of match to the information in the searchable data repository.

25. A system according to claim 12, wherein the search results are assigned a numerical score, the memory further storing instructions for implementing:
a search result orderer increasing the numerical score assigned to at least some of the search results in the particular language.

26. A system according to claim 25, wherein the numerical score is adjusted in accordance with the formula:

$$s_i = \frac{s_i + 1}{2}$$

where $s_i$ comprises the numerical score for each search result i.

27. A system according to claim 25, where the memory further stores instructions for implementing:
a language selector determining a second language that is different from the particular language; and
the search result orderer increasing the numerical score assigned to at least some of the search results in the second language.

28. A system according to claim 27, wherein the numerical score is adjusted in accordance with the formula:

$$s_i = \frac{(s_i \times 2) + 1}{3}$$

where $s_i$ comprises the numerical score for each search result i.

29. A system according to claim 12, wherein the search results are assigned a numerical score, the memory further storing instructions for implementing:
   a search result orderer decreasing the numerical score assigned to at least some of the search results in the particular language.

30. A system according to claim 29, where the memory further stores instructions for implementing:
   a language selector determining a second language that is different from the particular language; and
   where the search result orderer decreases the numerical score assigned to at least some of the search results in the second language.

31. A system according to claim 12, where:
   the presenter presents the search results in the adjusted order.

32. A system according to claim 31, where:
   the presenter performs at least one of controlling enablement of presentation of at least some of the search results in the particular language, grouping together at least some of the search results in the particular language, or arranging at least some of the search results in the particular language next to at least some of the search results in at least one language other than the particular language prior to presenting the search results.

33. A system according to claim 12, where the memory further stores instructions for implementing:
   a language selector selecting a second language that is different from the particular language.

34. A system according to claim 12, where the memory further stores instructions for implementing:
   a language selector including one or more related languages with the particular language.

35. A method, comprising:
   receiving, from a user, a search query;
   executing a search to create a list of search results by evaluating the search query against information in a plurality of search result languages that is maintained in a searchable data repository;
   determining a particular language applicable to the search results generated responsive to the executed search based on characteristics of the search query, characteristics of a user interface from which the search query is received, and characteristics of the search results;
   determining whether each of the search results are in the particular language;
   ordering one of the search results among other ones of the search results based on whether the one of the search results is in the particular language; and
   permitting the user to toggle between presentation of the list of search results with the one of the search results ordered among the other ones of the search results based on whether the one of the search results is in the particular language, and presentation of the list of search results without the one of the search results ordered among the other ones of the search results based on whether the one of the search results is in the particular language.

36. A method according to claim 35, further comprising:
   determining at least one of a character encoding or a language used in the search query; and
   selecting at least one language corresponding to the at least one of a character encoding or the language as the particular language.

37. A method according to claim 35, further comprising:
   determining at least one language used by the user interface; and
   selecting the at least one language used by the user interface as the particular language.

38. A method according to claim 37, further comprising:
   determining the at least one language used by the user interface based on at least one of the network address of a client application from which the search query was submitted, at least one of an accepted language or a character set of the client application, or a predetermined language specified as a stored preference independent of the search query.

39. A method according to claim 35, further comprising:
   determining a default language used by the user interface from which the search query is received;
   selecting a language other than the default language as the particular language;
   selecting the default language as another language; and
   further ordering a search result among other ones of the search results based on whether the search result is in the other language.

40. A method according to claim 35, where determining the particular language includes:
   determining at least one search result language for at least one of the search results; and
   selecting the at least one search result language as the particular language.

41. A method according to claim 40, wherein the at least one search result language is used in a majority of the search results.

42. A method according to claim 35, further comprising:
   ordering the search results based on a match of a language of such search results to the particular language.

43. A method according to claim 35, further comprising:
   ordering the search results by a degree of match of a language of such search results to the particular language.

44. A method according to claim 43, further comprising:
   demoting the search results in a language other than the particular language by a predefined shifting factor.

45. A method according to claim 44, wherein the predefined shifting factor substantially equals two (2.0).

46. A method according to claim 43, further comprising:
   promoting the search results in a language other than the particular language by a predefined shifting factor.

47. A method according to claim 35, further comprising:
   ordering each of the search results by a degree of match of terms of the search query to contents of the search results.

48. A method according to claim 35, wherein the search results are assigned a numerical score, the method further comprising:
   increasing the numerical score assigned to at least some of the search results in the particular language.

49. A method according to claim 48, wherein the numerical score is adjusted in accordance with the formula:

$$s_i = \frac{s_i + 1}{2}$$

where $s_i$ comprises the numerical score for each search result i.

50. A method according to claim 48, further comprising: determining a second language that is different from the particular language; and
increasing the numerical score assigned to at least some of the search results in the second language.

51. A method according to claim 50, wherein the numerical score is adjusted in accordance with the formula:

$$s_i = \frac{(s_i \times 2) + 1}{3}$$

where $s_i$ comprises the numerical score for each search result i.

52. A method according to claim 35, wherein the search results are assigned a numerical score, the method further comprising:
decreasing the numerical score assigned to at least some of the search results in the particular language.

53. A method according to claim 52, further comprising: determining a second language that is different from the particular language; and
decreasing the numerical score assigned to at least some of the search results in the second language.

54. A method according to claim 35, further comprising: presenting the search results.

55. A method according to claim 54, further comprising: performing at least one of controlling enablement of presentation of at least some of the search results in the particular language, grouping together at least some of the search results in the particular language, or arranging at least some of the search results in the particular language next to at least some of the search results in at least one language other than the particular language prior to presenting the search results.

56. A method according to claim 35, further comprising: selecting a second language that is different from the particular language.

57. A method according to claim 35, further comprising: including one or more related languages with the particular language.

58. A system implemented within a computing device, comprising:
a memory to store instructions for implementing:
a parser receiving a search query request message from a user, and parsing at least one of terms or attributes from the search query request message to identify Web content provided in a plurality of search result languages;
an indexer executing a search by evaluating the at least one of terms or attributes against information maintained in a searchable data repository and generating search results responsive to the executed search;
a language promoter identifying a particular language, comprising:
a language determiner evaluating characteristics of the search query request message and characteristics of the search results, and selecting the particular language based on the evaluated characteristics of the search query request message and the evaluated characteristics of the search results; and
a language orderer determining an order for at least some of the search results among other ones of the search results based on whether the at least some of the search results are in the particular language; and
a presenter presenting the search results in the determined order, the presenter permitting the user to toggle between presentation of the search results in the determined order and presentation of the search results in another order that is independent of whether the at least some of the search results are in the particular language; and
a processor to execute the instructions in the memory.

59. A system according to claim 58, where the memory further stores instructions for implementing:
a search query characterizer for at least one of determining at least one language used in the search query request message, or determining at least one character encoding used in the search query request message.

60. A system according to claim 58, where the memory further stores instructions for implementing:
a user interface characterizer for at least one of determining at least one predetermined language specified as a stored preference independent of the search query request message, determining at least one language accepted by a user interface, determining at least one character encoding accepted by the user interface, or determining a network address of a client application from which the search query request message was submitted.

61. A system according to claim 58, where the memory further stores instructions for implementing:
a search results characterizer determining at least one language used in one or more of the search results.

62. A system according to claim 61, where the at least one language used in a majority of the search results is chosen as the particular language.

63. A system according to claim 58, where the search results are generated in a ranked order, the memory further storing instructions for implementing:
a search result orderer ordering at least some of the search results in the particular language by a predefined shifting factor, comprising at least one of demoting each search result in a language other than the particular language by the predefined shifting factor and promoting each search result in the particular language by at least one position, or promoting each search result in a language other than the particular language by the predefined shifting factor and demoting each search result in the particular language by at least one position.

64. A system according to claim 63, where:
the search result orderer adjusts the predefined shifting factor based on available context in the search query request message and the search results.

65. A system according to claim 58, where the search results are generated in a ranked order by numerical score, the memory further storing instructions for implementing:
a search result orderer adjusting the numerical score of at least some of the search results by a predetermined weighting factor, comprising at least one of increasing the numerical score assigned to the search results in the particular language and maintaining the numerical score assigned to the search results in a language other than the particular language, or decreasing the numerical score assigned to the search results in the particular language and maintaining the numerical score assigned to the search results in a language other than the particular language.

66. A system according to claim 65, where:
the search result orderer adjusts the predetermined weighting factor based on available context in the search query request message and the search results.

67. A system according to claim 58, where the memory further stores instructions for implementing:
a language selector selecting a second language that is different from the particular language, comprising a default language accepted by a user interface from which the search query request message is received.

68. A system according to claim 67, where:
the language selector maintains the particular language and the second language independent of any such search query request message.

69. A system according to claim 58, wherein the search query request message and each search result response message is HTTP-compliant.

70. A method, comprising:
receiving a search query request message from a user, and parsing at least one of terms or attributes from the search query request message to identify Web content provided in a plurality of search result languages;
executing a search by evaluating the at least one of terms or attributes against information maintained in a searchable data repository and generating search results responsive to the executed search;
determining a particular language, comprising:
evaluating characteristics of the search query request message and characteristics of the search results; and
selecting the particular language based on the evaluated characteristics of the search query request message and the evaluated characteristics of the search results;
determining an order for the search results among other ones of the search results based on whether the search results are in the particular language;
presenting the search results in the determined order; and
permitting the user to toggle between presentation of the search results in the determined order and presentation of the search results in another order that is independent of whether the search results are in the particular language.

71. A method according to claim 70, wherein evaluating the at least one of the terms or attributes further comprises at least one of:
determining at least one language used in the search query request message; or
determining at least one character encoding used in the search query request message.

72. A method according to claim 70, wherein determining the particular language further comprises at least one of:
determining at least one predetermined language specified as a stored preference independent of the search query request message;
determining at least one language accepted by the user interface;
determining at least one character encoding accepted by the user interface; or
determining a network address of a client application from which the search query request message was submitted.

73. A method according to claim 70, wherein evaluating the search results characteristics further comprises:
determining at least one language used in one or more of the search results.

74. A method according to claim 73, further comprising:
choosing the at least one language used in a majority of the search results.

75. A method according to claim 70, wherein the search results are generated in a ranked order, the method further comprising:
ordering at least some of the search results in the particular language by a predefined shifting factor, comprising at least one of:
demoting each search result in a language other than the particular language by the predefined shifting factor and promoting each search result in the particular language by at least one position; or
promoting each search result in a language other than the particular language by the predefined shifting factor and demoting each search result in the particular language by at least one position.

76. A method according to claim 75, further comprising:
adjusting the predefined shifting factor based on available context in the search query request message and the search results.

77. A method according to claim 70, wherein the search results are generated in a ranked order by numerical score, the method further comprising:
adjusting the numerical score of at least some of the search results by a predetermined weighting factor, comprising at least one of:
increasing the numerical score assigned to the search results in the particular language and maintaining the numerical score assigned to the search results in a language other than the particular language; or
decreasing the numerical score assigned to the search results in the particular language and maintaining the numerical score assigned to the search results in a language other than the particular language.

78. A method according to claim 77, further comprising:
adjusting the predefined weighting factor based on available context in the search query request message and the search results.

79. A method according to claim 70, further comprising:
selecting a second language, that is different from the particular language, comprising a default language accepted by the user interface.

80. A method according to claim 79, further comprising:
maintaining the particular language and the second language independent of any such search query request message.

81. A method according to claim 70, wherein the search query request message and each search result response message is HTTP-compliant.

82. A method, comprising:
receiving a search query from a user;
performing a search, based on the search query, to identify a group of search results;
ordering the group of search results to form a first ordered list of search results;
identifying a language for the group of search results based on characteristics of the search query, characteristics of a user interface via which the search query is received, and characteristics of the group of search results;
determining whether each search result in the first ordered list of search results is in the identified language;
adjusting, for each of the search results that is in the identified language, a position of the search result within the first ordered list of search results to create a second ordered list of search results, where the second ordered list of search results is different from the first ordered list of search results;

presenting the second ordered list of search results; and permitting the user to toggle between presentation of the first ordered list of search results and the second ordered list of search results.

83. A computer-readable storage medium storing computer-executable instructions, comprising:

one or more instructions for receiving, from a user, a search query via a user interface;

one or more instructions for executing a search to generate search results in a plurality of languages;

one or more instructions for determining a particular language, comprising:

one or more instructions for evaluating characteristics of the search query and characteristics of the user interface, where the characteristics of the search query differ from the characteristics of the user interface; and one or more instructions for selecting the particular language based on the evaluated characteristics of the search query and the evaluated characteristics of the user interface;

one or more instructions for ordering at least some of the search results among other ones of the search results based on whether the at least some of the search results are in the particular language;

one or more instructions for presenting the ordered search results; and one or more instructions for permitting the user to toggle between presentation of the ordered search results and presentation of the search results in another order that is independent of whether the at least some of the search results are in the particular language.

* * * * *